US012639769B2

(12) United States Patent
Harvey et al.

(10) Patent No.: US 12,639,769 B2
(45) Date of Patent: May 26, 2026

(54) BACKUP OF METAVERSE ITEMS

(71) Applicant: STATE FARM MUTUAL AUTOMOBILE INSURANCE COMPANY, Bloomington, IL (US)

(72) Inventors: Brian N. Harvey, Bloomington, IL (US); Joseph Robert Brannan, Bloomington, IL (US); Joseph P. Harr, Bloomington, IL (US); Edward W. Breitweiser, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 86 days.

(21) Appl. No.: 18/124,360

(22) Filed: Mar. 21, 2023

(65) Prior Publication Data

US 2024/0103982 A1 Mar. 28, 2024

Related U.S. Application Data

(60) Provisional application No. 63/409,088, filed on Sep. 22, 2022.

(51) Int. Cl.
*G06Q 40/08* (2012.01)
*G06F 11/1446* (2026.01)
*G06Q 20/38* (2012.01)

(52) U.S. Cl.
CPC ......... *G06Q 40/08* (2013.01); *G06F 11/1464* (2013.01); *G06F 11/1469* (2013.01); *G06Q 20/389* (2013.01); *G06F 2201/815* (2013.01)

(58) Field of Classification Search
CPC .. G06Q 40/08; G06Q 20/389; G06F 11/1464; G06F 11/1469
USPC ............................................. 705/4
See application file for complete search history.

(56) References Cited

U.S. PATENT DOCUMENTS

| | | | |
|---|---|---|---|
| 8,888,598 B2 | 11/2014 | Mehta et al. | |
| 11,969,653 B2 | 4/2024 | Sanchez et al. | |
| 2007/0087820 A1 | 4/2007 | Van Luchene et al. | |
| 2007/0111770 A1 | 5/2007 | Van Luchene | |
| 2007/0117615 A1* | 5/2007 | Van Luchene | A63F 13/35 |
| | | | 463/25 |
| 2010/0169125 A1* | 7/2010 | Dawson | G06Q 40/08 |
| | | | 705/4 |

(Continued)

FOREIGN PATENT DOCUMENTS

KR 20110117837 A 10/2011

*Primary Examiner* — Hai Tran
(74) *Attorney, Agent, or Firm* — MARSHALL, GERSTEIN & BORUN LLP; William J. Samore

(57) ABSTRACT

The following relates generally to providing insurance for one or more virtual items in a virtual environment. In some embodiments, an insurance server receives a request for insurance for one or more virtual items from a customer. The insurance server then obtains information associated with the one or more virtual items from a virtual environment server, and determines an insurance premium based upon the received information. The following also relates generally to providing backups of virtual items. In some embodiments, a backup server creates backups of virtual items by writing data associated with the virtual item to a data store. The virtual items may be fungible or non-fungible. In some embodiments, the virtual items are periodically backed up.

15 Claims, 10 Drawing Sheets

(56)  References Cited

U.S. PATENT DOCUMENTS

| 2014/0100890 A1* | 4/2014 | Luciani | ................. | G06Q 40/08 |
| | | | | 705/4 |
| 2021/0027545 A1 | 1/2021 | Nussbaum et al. | | |
| 2024/0087038 A1 | 3/2024 | Brannan et al. | | |

* cited by examiner

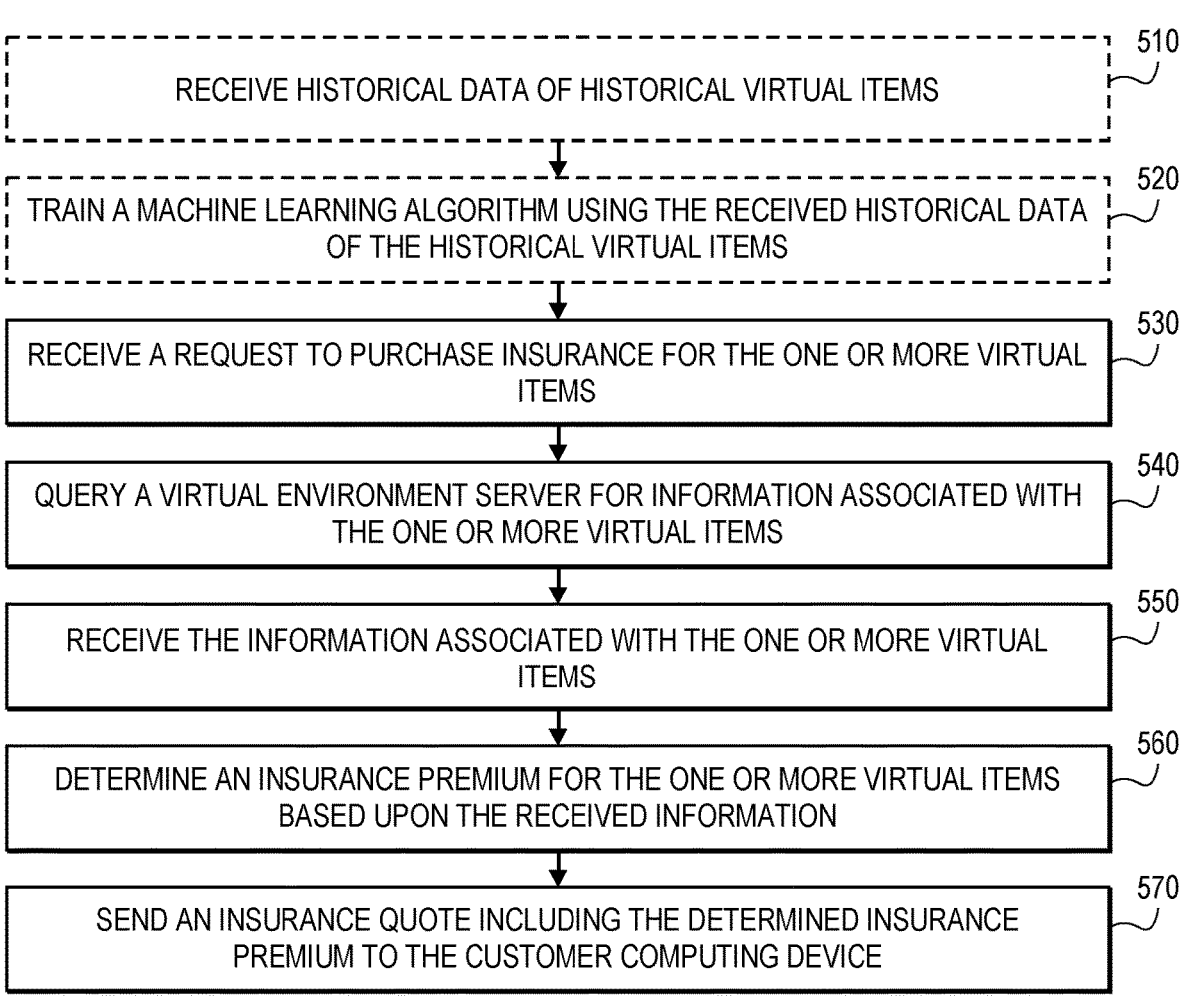

500

510 RECEIVE HISTORICAL DATA OF HISTORICAL VIRTUAL ITEMS

520 TRAIN A MACHINE LEARNING ALGORITHM USING THE RECEIVED HISTORICAL DATA OF THE HISTORICAL VIRTUAL ITEMS

530 RECEIVE A REQUEST TO PURCHASE INSURANCE FOR THE ONE OR MORE VIRTUAL ITEMS

540 QUERY A VIRTUAL ENVIRONMENT SERVER FOR INFORMATION ASSOCIATED WITH THE ONE OR MORE VIRTUAL ITEMS

550 RECEIVE THE INFORMATION ASSOCIATED WITH THE ONE OR MORE VIRTUAL ITEMS

560 DETERMINE AN INSURANCE PREMIUM FOR THE ONE OR MORE VIRTUAL ITEMS BASED UPON THE RECEIVED INFORMATION

570 SEND AN INSURANCE QUOTE INCLUDING THE DETERMINED INSURANCE PREMIUM TO THE CUSTOMER COMPUTING DEVICE

| | 1005 |
|---|---|
| RECEIVE A REQUEST TO BACKUP A VIRTUAL ITEM | |

↓

| | 1010 |
|---|---|
| TRANSMIT A REQUEST TO A VIRTUAL ENVIRONMENT SERVER FOR A VIRTUAL ITEM MODEL ASSOCIATED WITH THE VIRTUAL ITEM | |

↓

| | 1015 |
|---|---|
| RECEIVE VIRTUAL ITEM MODEL FROM THE VIRTUAL ENVIRONMENT SERVER | |

↓

| | 1020 |
|---|---|
| WRITE THE VIRTUAL ITEM MODEL TO A DATA STORE ASSOCIATED WITH THE BACKUP SERVER | |

| | 1105 |
|---|---|
| RECEIVE A REQUEST TO BACKUP A VIRTUAL ITEM | |

↓

| | 1110 |
|---|---|
| SEND REQUEST FOR A VOUCHER FOR THE VIRTUAL ITEM | |

↓

| | 1115 |
|---|---|
| RECEIVE THE VOUCHER TO PURCHASE THE VIRTUAL ITEM | |

↓

| | 1120 |
|---|---|
| RECEIVE AN INDICATION THAT THE VIRTUAL ITEM SHOULD BE RESTORED TO THE VIRTUAL ENVIRONMENT | |

↓

| | 1125 |
|---|---|
| REDEEM VOUCHER | |

FIG. 11

BACKUP OF METAVERSE ITEMS

CROSS REFERENCE TO RELATED APPLICATIONS

This application claims the benefit of U.S. Provisional Patent Application No. 63/409,088, entitled "Insurance for Metaverse items, and backup of Metaverse items," filed Sep. 22, 2022. U.S. Provisional Patent Application No. 63/409, 088 is hereby expressly incorporated by reference herein in its entirety.

FIELD

The present disclosure generally relates to virtual environments. More particularly, the present disclosure relates to providing insurance for one or more virtual items.

BACKGROUND

Many people spend vast amounts of time and money creating virtual characters or other items in virtual environments. However, the virtual items may be lost for various real-world reasons, such as corruption of data at a virtual environment server, a security breach, physical destruction of the virtual environment server, etc.

In other examples, the virtual items may be lost due to virtual world reasons. In one such example, the virtual item may be a vehicle that is destroyed in an accident in the virtual environment. In another such example, the item may be a house that is destroyed in a fire in the virtual environment. In yet another such example, the virtual item may be a character that is killed in the virtual environment (e.g., by an attack from another character, a car accident, a house fire, etc.).

The systems and methods disclosed herein provide solutions to these problems and others.

SUMMARY

The present embodiments relate to, inter alia, providing insurance for virtual items. For example, it may be wise for a user of a virtual environment to purchase insurance for a virtual character she creates because of the large amount of time and money she may spend on the virtual character. To this end, the virtual environment user (e.g., an insurance customer) may send a request to purchase insurance for one or more virtual items to an insurance server. The insurance server may then determine an insurance premium for the one or more virtual items, and send an insurance quote including the determined insurance premium back to the virtual environment user.

In one aspect, a computer-implemented method for insurance of one or more virtual items in a virtual environment may be provided. The method may include: (1) receiving, via one or more processors and from a customer computing device, a request to purchase insurance for the one or more virtual items; (2) in response to receiving the request, querying, via the one or more processors, a virtual environment server for information associated with the one or more virtual items; (3) receiving, via the one or more processors, from the virtual environment server, the information associated with the one or more virtual items; (4) determining, via the one or more processors, an insurance premium for the one or more virtual items based upon the received information; and/or (5) sending, via the one or more processors, an insurance quote including the determined insurance premium to the customer computing device. The method may include additional, fewer, or alternate actions, including those discussed elsewhere herein.

In another aspect, a computer system configured to provide insurance of one or more virtual items in a virtual environment may be provided. The computer system may include one or more processors configured to: (1) receive from a customer computing device, a request to purchase insurance for the one or more virtual items; (2) in response to receiving the request, query, a virtual environment server for information associated with the one or more virtual items; (2) receive from the virtual environment server, the information associated with the one or more virtual items; (3) determine an insurance premium for the one or more virtual items based upon the received information; and/or (4) send an insurance quote including the determined insurance premium to the customer computing device. The computer system may include additional, less, or alternate functionality, including that discussed elsewhere herein.

In yet another aspect, a computer device configured to provide insurance of one or more virtual items in a virtual environment may be provided. The computer device may include: one or more processors; and/or one or more memories coupled to the one or more processors. The one or more memories including computer executable instructions stored therein that, when executed by the one or more processors, may cause the one or more processors to: (1) receive from a customer computing device, a request to purchase insurance for the one or more virtual items; (2) in response to receiving the request, query, a virtual environment server for information associated with the one or more virtual items; (2) receive from the virtual environment server, the information associated with the one or more virtual items; (3) determine an insurance premium for the one or more virtual items based upon the received information; and/or (4) send an insurance quote including the determined insurance premium to the customer computing device. The computer device may include additional, less, or alternate functionality, including that discussed elsewhere herein.

The present embodiments also relate to, inter alia, providing backups for virtual items. For example, due to the possibility of data loss (e.g., from data corruption, physical destruction of computer hardware, security breaches, etc.) it may be wise for a user to obtain backup options for virtual items in a virtual environment.

In one aspect, a computer-implemented method for providing a backup of a virtual item in a virtual environment may be provided. The method may include: (1) receiving, via one or more processors of a backup server, a request to backup the virtual item; (2) transmitting, via the one or more processors of the backup server and to a virtual environment server, a request for a virtual item model associated with the virtual item, wherein the virtual item model is configured to store data representative of the virtual item such that a virtual environment server is able to import the virtual item into a virtual environment; (3) receiving, via the one or more processors of the backup server and from the virtual environment server, the virtual item model; and/or (4) writing, via the one or more processors of the backup server, the virtual item model to a data store associated with the backup server. The method may include additional, fewer, or alternate actions, including those discussed elsewhere herein.

In another aspect, a computer-implemented method for providing a backup of a virtual item in a virtual environment may be provided. The method may include: (1) receiving, via one or more processors of a backup server, a request to backup the virtual item, wherein: (i) the request includes a virtual item model associated with the virtual item, and (ii) the request is received from either a virtual environment server that is a primary source of data for virtual items in the virtual environment, or a user device, and (ii) the request is received from either a virtual environment server that is a primary source of data for virtual items in the virtual environment, or a user device; and/or (2) in response to receiving the request, writing, via the one or more processors of the backup server, the virtual item model to a data store associated with the backup server. The method may include additional, fewer, or alternate actions, including those discussed elsewhere herein.

In yet another aspect, a computer-implemented method for providing a backup of a virtual item in a virtual environment may be provided. The method may include: (1) receiving, via one or more processors of a backup server, a request to backup the virtual item, the request including: (i) an identifier of the virtual item, and/or (ii) an identifier of a user that owns the virtual item; (2) sending, via the one or more processors of the backup server, a request for a voucher with the virtual environment server for the virtual item; (3) receiving, via the one or more processors of the backup server and from the virtual environment server, the voucher for the virtual item; (4) receiving, via the one or more processors of the backup server, an indication that the virtual item should be restored to the virtual environment; and/or (5) in response to receiving the indication, redeeming, via the one or more processors of the backup server, the voucher for the virtual item such that a copy of the virtual item is restored to the user. The method may include additional, fewer, or alternate actions, including those discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 5 illustrates an exemplary computer-implemented method for providing insurance for one or more virtual items, according to one embodiment.

FIG. 10 shows an exemplary computer-implemented method of providing a backup of a virtual item in a virtual environment, according to one embodiment.

FIG. 11 shows an exemplary computer-implemented method of providing a backup of a fungible virtual item in a virtual environment, according to one embodiment.

DETAILED DESCRIPTION

The systems and methods disclosed herein relate to, inter alia, providing insurance for one or more virtual items and/or providing a backup of a virtual item.

As used herein, the term virtual environment should be understood to refer to a virtual world, such as a metaverse, a virtual game world, an augmented-reality based virtual world, etc. As is understood in the art, in some examples, the virtual environment may be accessed by any computing device, such as a computer, a tablet, a smartphone, a virtual reality (VR) headset, an augmented reality (AR) headset or glasses, smart glasses, etc.

Exemplary System for Providing Insurance for One or More Virtual Items

Figure 1:
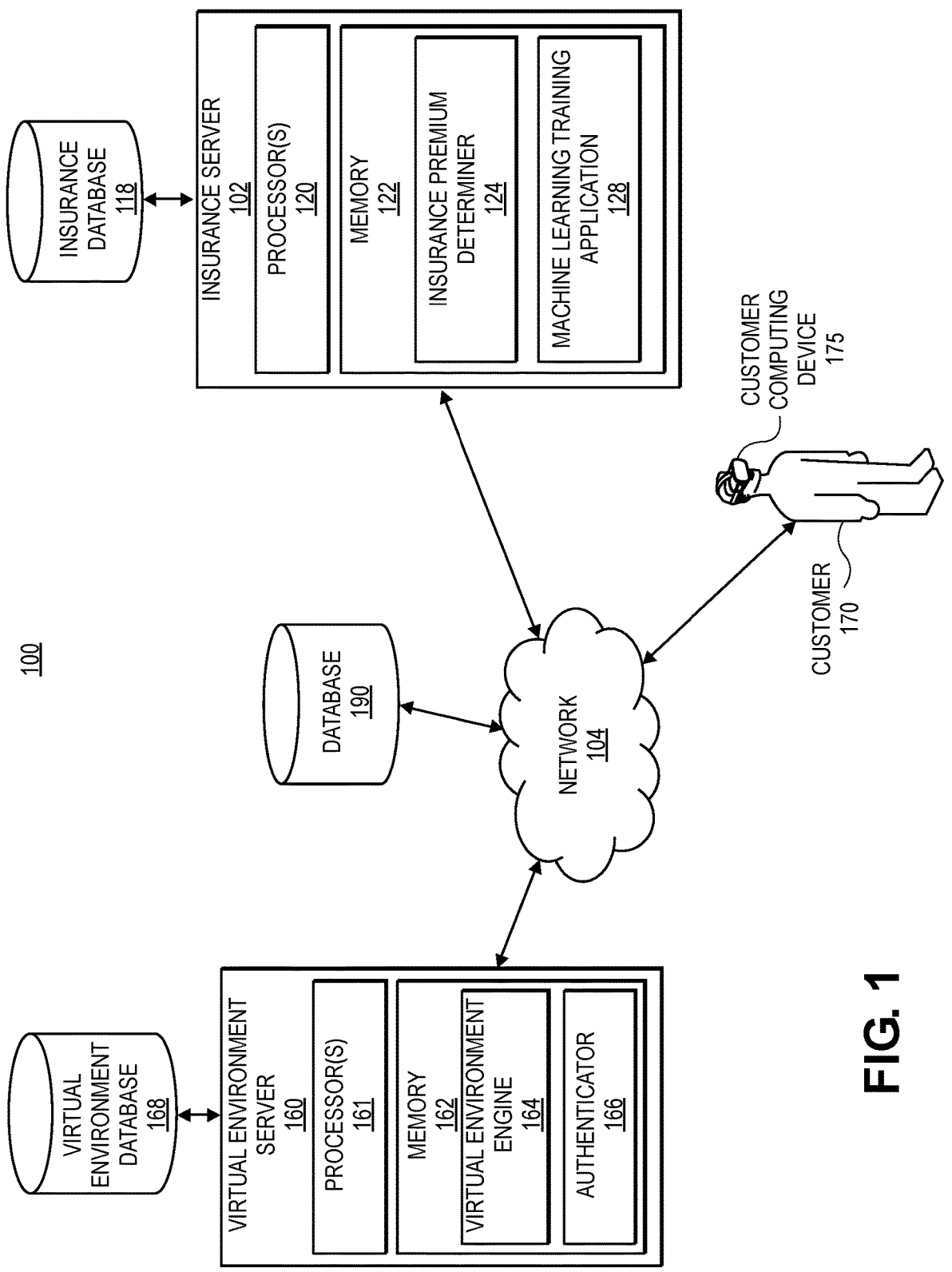
FIG. 1 depicts an exemplary computer system for providing insurance for one or more virtual items, according to one embodiment.

FIG. 1 shows an exemplary computer system 100 for insurance of one or more virtual items in which the exemplary computer-implemented methods described herein may be implemented. The high-level architecture includes both hardware and software applications, as well as various data communications channels for communicating data between the various hardware and software components.

Broadly speaking, a virtual environment, such as a metaverse, may be provided by the virtual environment server 160. The virtual environment may allow user-controlled characters (e.g., as represented by avatars in the virtual environment) to traverse the virtual world, interact with each other, gain experience, make purchases for real or virtual items, etc. As referred to herein, purchases refer to purchases made in traditional currency (e.g., U.S. dollars, Euros, etc.), cryptocurrency (e.g., Bitcoin, etc.), virtual currency (e.g., a currency used solely in the virtual world), and/or in exchange for other real or virtual items.

The virtual environment may be provided by the virtual environment server 160. The virtual environment server 160 may include one or more processors 161 such as one or more microprocessors, controllers, and/or any other suitable type of processor. The virtual environment server 160 may further include a memory 162 (e.g., volatile memory, non-volatile memory) accessible by the one or more processors 161, (e.g., via a memory controller). The one or more processors 161 may interact with the memory 162 to obtain and execute, for example, computer-readable instructions stored in the memory 162. Additionally or alternatively, computer-readable instructions may be stored on one or more removable media (e.g., a compact disc, a digital versatile disc, removable flash memory, etc.) that may be coupled to the virtual environment server 160 to provide access to the computer-readable instructions stored thereon. In particular, the computer-readable instructions stored on the memory 162 may include instructions for executing various applications, such as virtual environment engine 164, and/or an authenticator 166.

In operation, the virtual environment engine 164 may provide the virtual environment. For example, as described elsewhere herein, the virtual environment engine 164 may provide the virtual environment to users such that characters may travel through the virtual environment, interact with each other, gain experience, make purchases, etc.

For instance, a customer 170 may wish to participate in the virtual environment. To do so, the customer 170 may use customer computing device 175 (e.g., a virtual reality (VR) headset, a computer, a tablet, a smartphone, an augmented reality (AR) headset, a server, etc.) to access the virtual environment. In this way, the customer 170 may create a character to interact with the virtual environment.

The virtual environment engine 164 may store information of the character in the memory 162 and/or the virtual environment database 169. Furthermore, the memory 162 and/or the virtual environment database 169 may store any information related to the virtual environment. For example, the memory 162 and/or the virtual environment database 169, may store information of: characters, buildings, objects (e.g., vehicles, items of the characters, such as tools, weapons, etc.), businesses (e.g., insurance business, such as an insurance business that owns insurance server 102), etc.

To access the virtual environment, in some examples, the customer 170 must be authenticated. To this end, the authenticator 166 may authenticate the customer 170. As will be described elsewhere herein, the authentication may be based upon authentication credentials, such as biometric data received from the customer computing device 175 (e.g., a VR headset automatically gathers biometric data and sends it as part of the authentication process).

Additionally or alternatively to authenticating the customer 170, the authenticator 166 may authenticate the insurance server 102. Once authenticated, in some embodiments, the insurance server 102 may be permitted by the virtual environment server 160 to provide insurance services to users of the virtual environment (e.g., customer 170). For example, as will be described elsewhere herein, the insurance server 102 may provide insurance to the customer 170 for one or more virtual items.

The insurance server 102 may include one or more processors 120 such as one or more microprocessors, controllers, and/or any other suitable type of processor. The insurance server 102 may further include a memory 122 (e.g., volatile memory, non-volatile memory) accessible by the one or more processors 120, (e.g., via a memory controller). The one or more processors 120 may interact with the memory 122 to obtain and execute, for example, computer-readable instructions stored in the memory 122. Additionally or alternatively, computer-readable instructions may be stored on one or more removable media (e.g., a compact disc, a digital versatile disc, removable flash memory, etc.) that may be coupled to the insurance server 102 to provide access to the computer-readable instructions stored thereon. In particular, the computer-readable instructions stored on the memory 122 may include instructions for executing various applications, such as insurance premium determiner 124, and/or machine learning training application 128.

Figure 2:
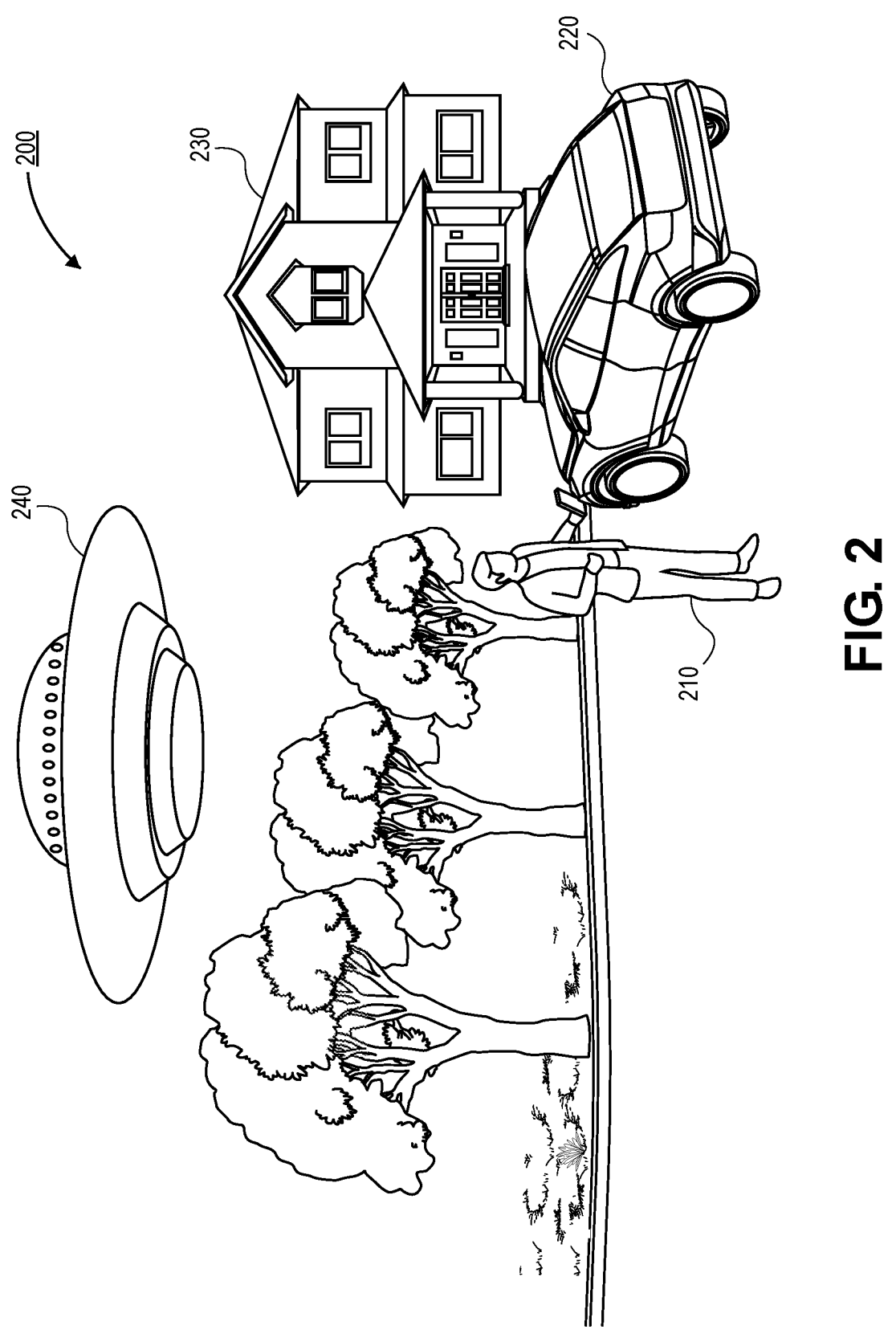
FIG. 2 depicts an exemplary virtual environment with one or more virtual items that may be insured.

In some embodiments, the insurance server 102 may provide insurance to a customer, such as the customer 170. For example, with reference to the example virtual environment 200 of FIG. 2, the customer 170 may have the virtual: character 210, car 220, house 230, and spaceship 240. In this example, the insurance server 102 may sell insurance to the customer 170 for any of the virtual items (e.g., the virtual character 210, car 220, house 230, and/or spaceship 240). However, it should be appreciated that these are simply examples, and the insurance server 102 may sell insurance to the customer 170 for any kind of virtual item.

To this end, and as will be described further below, the insurance premium determiner 124 may determine an insurance premium for one or more of the virtual items based upon: (i) a prevalence of the one or more virtual items in the virtual environment, (ii) an initial cost of the one or more virtual items that the one or more virtual items were initially purchased for, (iii) updates and/or modifications to the one or more virtual items, (iv) an availability of the one or more virtual items, (v) a cost of a similar one or more virtual items similar to the one or more virtual items, (vi) a cost of one or more real-world items corresponding to one or more virtual items, (vii) an experience level of the one or more virtual items, and/or (viii) a capability level of one or more virtual items.

The insurance premium determiner 124 may determine the insurance premium(s) via any suitable technique. For example, the insurance premium determiner 124 may determine the insurance premium(s) by using a trained machine learning algorithm, as will be described further below. In some examples, the machine learning algorithm may be trained by the machine learning training application 128.

To determine the insurance premium and/or train the machine learning algorithm, as will be described further below, the insurance server 102 may receive data from any suitable source, such as the virtual environment server 160, the database 190, etc. In some embodiments, the database 190 is an external database that, although not owned by a company that owns the virtual environment server, broadly stores information of virtual environments.

Furthermore, in some embodiments, the customer 170 is also a vender (e.g., an entity that sells virtual items in the virtual environment). Thus, in some embodiments, the customer computing device 175 may comprise a vender server. Moreover, in some embodiments where the customer 170 is a vender, the one or more virtual items that the insurance server 102 may insure are part of the vender's inventory.

In addition, further regarding the example system 100, the illustrated example components may be configured to communicate, e.g., via a network 104 (which may be a wired or wireless network, such as the internet), with any other component. Furthermore, although the example system 100 illustrates only one of each of the components, any number of the example components are contemplated (e.g., any number of customers, customer devices, virtual environment servers, databases, insurance servers, etc.).

Figure 3:
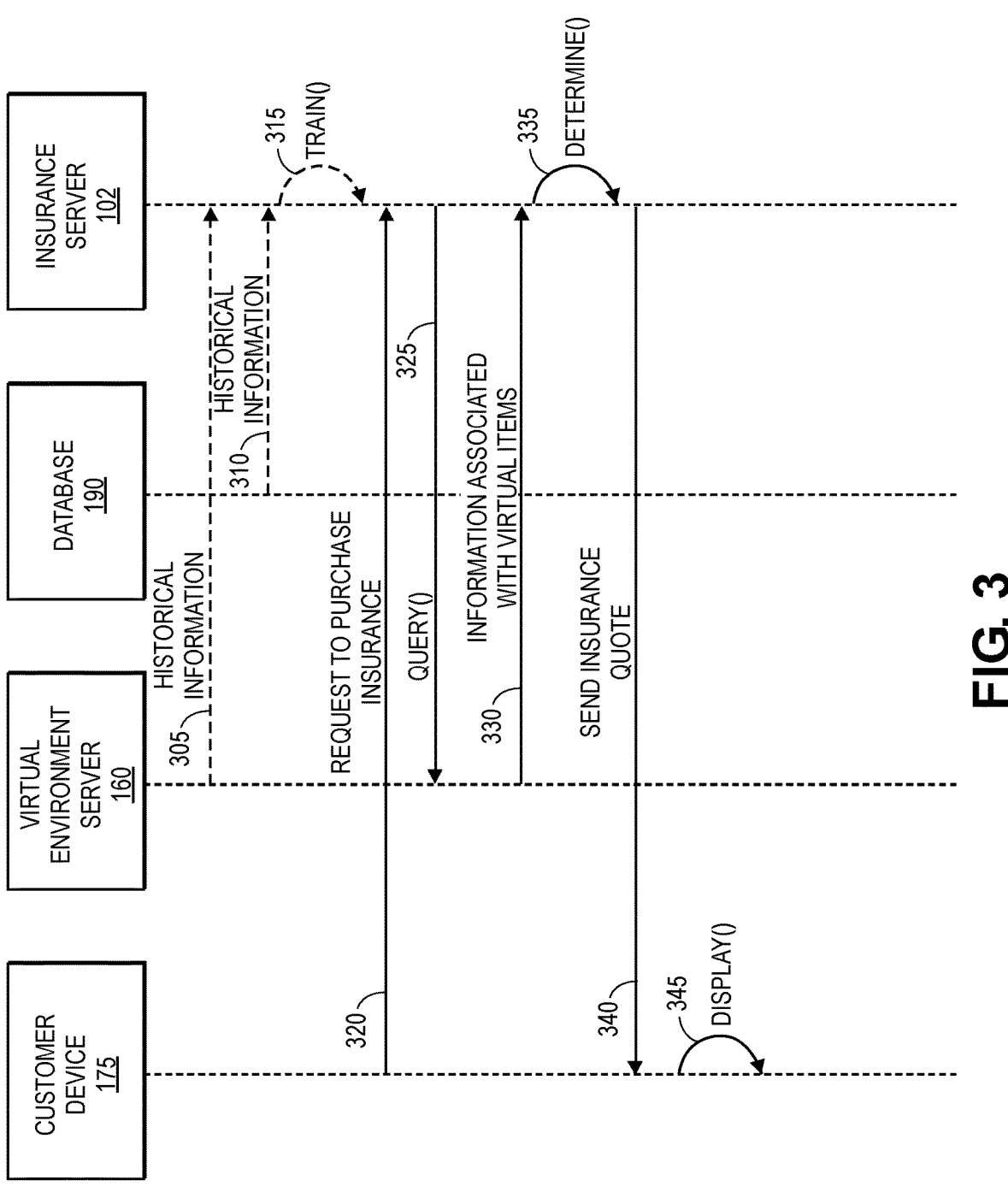
FIG. 3 depicts an exemplary signal diagram for providing insurance for one or more virtual items, according to one embodiment.

Exemplary Signal Diagram Illustration of Exemplary Provision of Insurance for One or More Virtual Items FIG. 3 illustrates an exemplary signal diagram 300 for providing insurance for one or more virtual items, according to an embodiment. More particularly, the signal diagram 300 illustrates the signals exchanged and/or detected by various components of an insurance for virtual items system, such as the example system 100.

The signal diagram 300 may optionally begin when the virtual environment server 160 optionally sends (305) historical information of historical virtual items to the insurance server 102. The historical information may be used to train a machine learning algorithm to determine an insurance premium, as will be described further below (e.g., with respect to FIG. 4A). The historical information may include any information of historical virtual items (e.g., virtual characters, virtual buildings, virtual vehicles, such as virtual cars, drones, and/or spaceships, etc.). Examples of the historical information include: (i) a prevalence of the one or more historical virtual items in the virtual environment, (ii) an initial cost of the one or more historical virtual items that the one or more virtual items were initially purchased for, (iii) updates and/or modifications to the one or more historical virtual items, (iv) an availability of the one or more historical virtual items, (v) a cost of a similar one or more historical virtual items similar to the one or more virtual items, (vi) a cost of one or more real-world items corresponding to one or more historical virtual items, (vii) an experience level of the one or more historical virtual items, and/or (viii) a capability level of one or more historical virtual items.

The insurance server 102 may also optionally retrieve (310) historical information of historical virtual items from the database 190. Similarly to the historical information sent by the virtual environment server 160, the historical information retrieved from the database 190 may be used to train the machine learning algorithm to determine an insurance premium, as will be described further below (e.g., with respect to FIG. 4A). For instance, the historical information retrieved from the database 190 may include any information of historical virtual items (e.g., virtual characters, virtual buildings, virtual vehicles such as virtual cars, drones, and/or spaceships, etc.). Examples of the historical information retrieved from the database 190 include: (i) a prevalence of the one or more historical virtual items in the virtual environment, (ii) an initial cost of the one or more historical virtual items that the one or more virtual items were initially purchased for, (iii) updates and/or modifications to the one or more historical virtual items, (iv) an availability of the one or more historical virtual items, (v) a cost of a similar one or more historical virtual items similar to the one or more virtual items, (vi) a cost of one or more real-world items corresponding to one or more historical virtual items, (vii) an experience level of the one or more historical virtual items, and/or (viii) a capability level of one or more historical virtual items.

The insurance server 102 may then optionally train (315) the machine learning algorithm to determine insurance premiums based upon input data, as will be described further below (e.g., with respect to FIG. 4A). In some embodiments, the input data is of a similar data type as the historical information received at 305, 310.

The insurance server 102 may receive (320), from the customer device 175, a request to purchase insurance for one or more virtual items. The one or more virtual items that insurance may be purchased for may be any virtual items that exist in the virtual environment. Examples of the one or more virtual items include virtual: characters, buildings, real estate, virtual vehicles (e.g., cars, buses, tanks, all-terrain vehicles, drones, spaceships, planes, helicopters, trains, etc.). In addition, the request may include other information as well, such as a request to provide the insurance only upon a character reaching a particular experience level.

In response to receiving the request, the insurance server 102 may query (325) the virtual environment server 160 for information associated with the one or more virtual items. The query for any information associated with the one or more virtual items. Examples of the information associated with the one or more virtual items include: (i) a prevalence of the one or more virtual items in the virtual environment, (ii) an initial cost of the one or more virtual items that the one or more virtual items were initially purchased for, (iii) updates and/or modifications to the one or more virtual items, (iv) an availability of the one or more virtual items, (v) a cost of a similar one or more virtual items similar to the one or more virtual items, (vi) a cost of one or more real-world items corresponding to one or more virtual items, (vii) an experience level of the one or more virtual items, and/or (viii) a capability level of one or more virtual items.

In some embodiments, the query may be narrow (e.g., a request for only information of prevalence of the one or more virtual items in the virtual environment). Advantageously, a narrow request (e.g., a request for only three or less of: (i) a prevalence of the one or more virtual items in the virtual environment, (ii) an initial cost of the one or more virtual items that the one or more virtual items were initially purchased for, (iii) updates and/or modifications to the one or more virtual items, (iv) an availability of the one or more virtual items, (v) a cost of a similar one or more virtual items similar to the one or more virtual items, (vi) a cost of one or more real-world items corresponding to one or more virtual items, (vii) an experience level of the one or more virtual items, and/or (viii) a capability level of one or more virtual items) results in less computational resources (e.g., processing power and memory) being used at both the insurance server 102 and the customer device 175. For example, less bandwidth is used in the transmission of the information since less information is being transmitted. In another example, less resources are being used at the virtual environment server 160 because it is searching for less information. In yet another example, less resources will be used at the insurance server 102 because it may determine (e.g., by a non-machine or machine learning technique) the insurance premium based upon less information. Even more advantageously, the insurance premium may be calculated faster because there is less data to consider.

In other embodiments, the query is broad (e.g., a request for all information regarding the one or more virtual items, a request for a large amount of information regarding the one or more virtual items, a request for easily available information regarding the one or more virtual items, such as data maintained in a model associated with the virtual item, etc.). These embodiments may have the advantage that the determined insurance premium may be more accurate because it uses more data points to determine the insurance premium.

In some embodiments, the scope of the query is based upon an initial determination of the type(s) of virtual items in the one or more virtual items. In one example, if the one or more virtual items includes a character, the query may include the experience level of the character and/or items associated with the character. In another example, if the virtual item is a car, the query may be for a prevalence of the car and/or for updates and/or modifications to the virtual item. Advantageously, making this initial determination, and then querying only for specific information that is determinative for a specific item type, improves technical functioning. For example, because only information for the specific item type is being transmitted, less bandwidth is used in the transmission. In another example, less resources are being used at the virtual environment server 160 because it is searching for less information. In yet another example, less resources will be used at the insurance server 102 because it may determine (e.g., by a non-machine learning or machine learning technique) the insurance premium based upon less information.

The virtual environment server 160 may then send (330), to the insurance server 102, the information indicated by the query.

The insurance server 102 may then determine (335) (e.g., via the insurance premium determiner 124) the insurance premium for the one or more virtual items. The determination may be made by any suitable technique. In some examples, the determination is made via a machine learning algorithm, as will be described further below (e.g., with respect to FIG. 4A).

However, in other examples, the determination may be made by a technique that does not use machine learning. For example, the determination may be made using lookup table(s). In another example, the determination may be made based upon equations correlating the determined insurance premium to the information associated with the one or more virtual items.

Regardless of whether the determination is made via machine learning or not, the determination may be made based upon the information associated with the one or more virtual items (e.g., sent at 330). As described above, examples of the information associated with the one of more virtual items include: (i) a prevalence of the one or more virtual items in the virtual environment, (ii) an initial cost of the one or more virtual items that the one or more virtual items were initially purchased for, (iii) updates and/or modifications to the one or more virtual items, (iv) an availability of the one or more virtual items, (v) a cost of a similar one or more virtual items similar to the one or more virtual items, (vi) a cost of one or more real-world items corresponding to one or more virtual items, (vii) an experience level of the one or more virtual items, and/or (viii) a capability level of one or more virtual items.

In addition, in some examples, the customer 170 may not believe that it is worthwhile to purchase insurance for a new virtual character that the customer 170 has not invested time and/or money in. In this regard, the customer 170 may wish only to pay for insurance for a virtual character once she has invested a significant amount of time using the character in the virtual environment and/or the character has become valuable enough to justify the purchase of insurance. Thus, in some examples, in response to the character attaining a predetermined experience level, the insurance server 102 sends an offer to the customer 170 to purchase insurance for the character. As other examples, the insurance server 102 may send an offer to insure a rare virtual item when obtained by the customer 170 or when the customer 170 has created and/or updated a user-customized virtual item.

Additionally or alternatively, because a character's value may change over time with increasing experience, etc., the insurance premium may change over time as well. As such, in some embodiments, the insurance premium may be recalculated and/or updated. Thus, in some such examples (not shown in FIG. 3), the insurance server 102 may periodically receive updated data associated with the virtual item, and then recalculate and/or update the insurance premium. In these embodiments, the insurance server may send a notification to the customer device 175 requesting approval to update the insurance policy with the new premium. If the customer 170 approves the update, the policy may be updated with the new premium.

More broadly, the insurance server 102 may receive updates to the virtual item, and recalculate the insurance premium based upon the updates. In some embodiments, based on the received updates, the insurance server may send an updated quote, or an offer to purchase insurance to the customer 170. For example, if the received update includes information that a character has attained a predetermined experience level, the insurance server 102 may send an offer to purchase insurance for the character.

Additionally or alternatively, the insurance premium may provide coverage for the customer 170 committing copyright infringement. For example, the customer 170, by designing a character in the virtual environment, may inadvertently infringe a copyright (e.g., a copyright in the real world or in the virtual environment). As such, the insurance server 102 may provide insurance policies to insure against such inadvertent infringements.

Additionally or alternatively, the determined insurance premium may cover copyright infringement of the one or more virtual items. For example, the customer 170 may have copyright rights in the one or more virtual items, which the customer desires to insure. In some such examples, another user of the same or different virtual environment as the customer 170 may commit copyright infringement of the customer's 170 copyright rights, causing financial and/or reputational harm to the customer 170. Thus, it may be wise for the customer 170 to purchase insurance for copyright infringement of the one or more virtual items.

Additionally or alternatively, in some examples where the customer 170 is a vender, the one or more virtual items may be (or be part of) an inventory list of the customer 170. For example, the customer 170 may have an inventory of virtual items that she is selling in the virtual environment, which she wishes to purchase insurance for.

Once the insurance premium is determined, the insurance server 102 may send (340) an insurance quote including the insurance premium to the customer computing device 175.

At 345, the customer device 175 may display the quote via a user interface. Accordingly, the customer 170 may be able to accept, decline, and/or propose modification to the insurance quote via the user interface.

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Exemplary Machine Learning Techniques

Broadly speaking, the machine learning training application 128 may train a machine learning algorithm to, for example, determine an insurance premium for the one or more virtual items. FIG. 4A is a block diagram of an exemplary machine learning modeling method 400 for training and evaluating a machine learning model (e.g., a machine learning algorithm), in accordance with various embodiments. In some embodiments, the model "learns" an algorithm capable of performing the desired function, such as determining an insurance premium for the one or more virtual items. It should be understood that the principles of FIG. 4A may apply to any machine learning algorithm discussed herein.

At a high level, the machine learning modeling method 400 includes a block 410 to prepare the data, a block 420 to build and train the model, and a block 430 to run the model.

Block 410 may include sub-blocks 412 and 416. At block 412, the machine learning training application 128 may receive the historical information to train the machine learning algorithm. The historical information may include any information of historical virtual items (e.g., virtual characters, virtual buildings, virtual vehicles, such as virtual cars, drones, and/or spaceships, etc.). Examples of the historical information include: (i) a prevalence of the one or more historical virtual items in the virtual environment, (ii) an initial cost of the one or more historical virtual items that the one or more virtual items were initially purchased for, (iii) updates and/or modifications to the one or more historical virtual items, (iv) an availability of the one or more historical virtual items, (v) a cost of a similar one or more historical virtual items similar to the one or more virtual items, (vi) a cost of one or more real-world items corresponding to one or more historical virtual items, (vii) an experience level of the one or more historical virtual items, (viii) a capability level of one or more historical virtual items, (ix) historical insurance premiums of historical virtual items, and/or (x) costs of virtual items at times of losses.

In some embodiments, the machine learning algorithm may be trained using the above (i)-(viii) as inputs to the machine learning model (e.g., also referred to as independent variables, or explanatory variables), and the above (ix)-(x) are used as the outputs of the machine learning model (e.g., also referred to as a dependent variables, or response variables). Put another way, each of the above (i)-(viii) may have an impact on (ix)-(x), which the machine learning algorithm is trained to find.

In some scenarios, the historical data includes historical insurance premiums. In some such scenarios, the machine learning algorithm may be directly trained to predict insurance premiums using the historical insurance premiums.

However, in other scenarios, the historical insurance premiums may not be available (or there is not sufficient data available to train the machine learning algorithm). As such, in some embodiments, the machine learning algorithm may be trained to determine insurance premiums via the output of the costs of virtual items at time of losses. For example, the machine learning algorithm may be trained to predict the costs of the virtual items at the time of loss (e.g., based upon (i)-(viii), etc.); then, further techniques may use the predicted cost at the time of loss to determine the insurance premium. For instance, the predicted cost at the time of loss (e.g., the output of the machine learning algorithm), may be input into a second model that determines insurance premium from the cost at the time of loss and/or other factors, as will be explained further below.

Figures 4A, 4B:
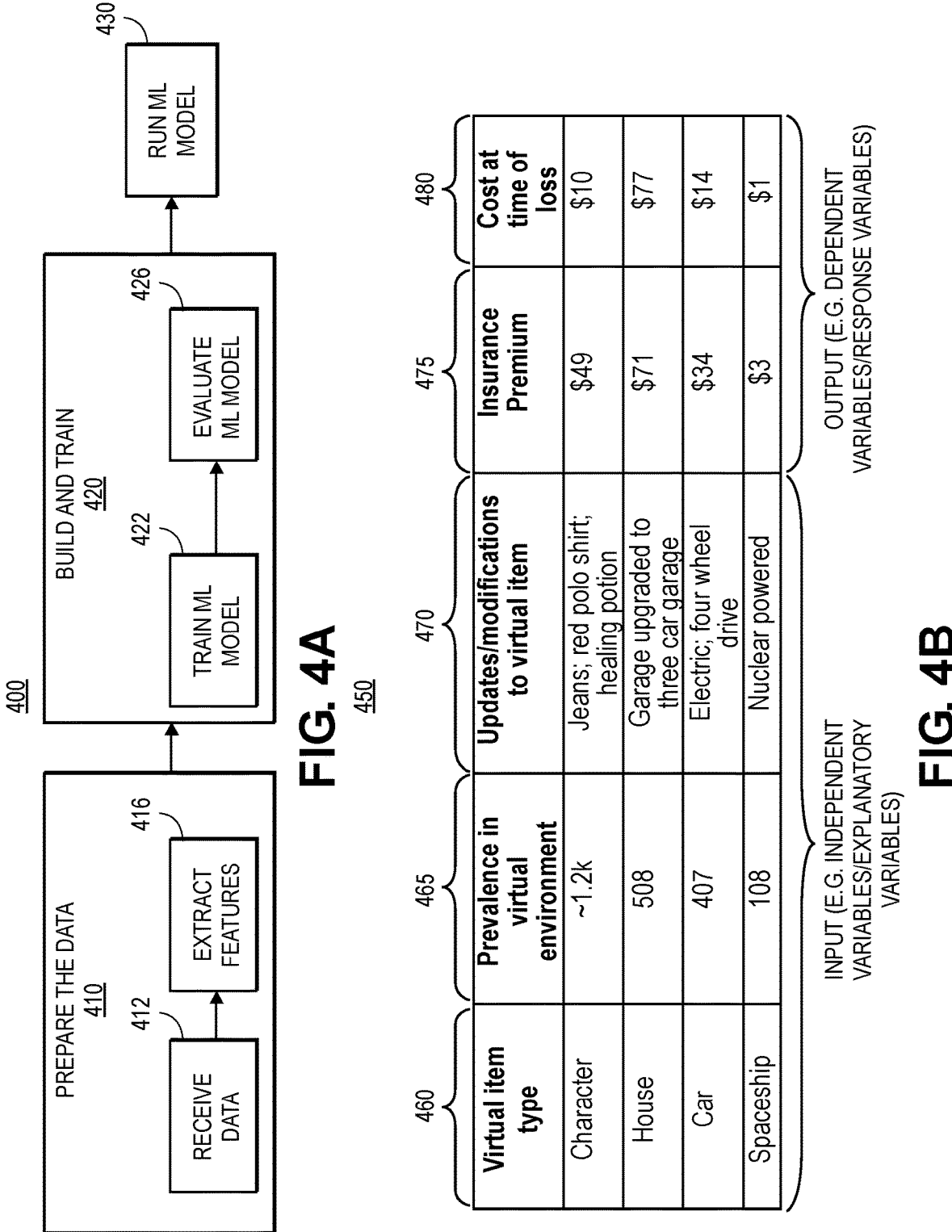
FIG. 4A illustrates an exemplary block diagram of an example machine learning modeling method for training and evaluating a machine algorithm, in accordance with various embodiments.
FIG. 4B illustrates an exemplary table of historical virtual item information.

To this end, in some embodiments, the historical information may be held in the form of a table, such as the example table 450 illustrated in the example of FIG. 4B. The illustrated example table 450 includes virtual item type 460, a prevalence in the virtual environment 465, updates/modifications to the virtual item 470, insurance premium 475, and cost at time of loss 480. It should be appreciated that the data table 450 is one example data structure associated with the historical information. In other examples, the backup server may implement one or more alternate data structures that represent the historical information. Additionally, in some embodiments, the insurance server normalizes one or more of the input variables to, for example, a scale of 0 to 1.

Generally, the machine learning model is trained to identify how each of the input variables may influence the output variables. For example, the less prevalent an item is in the virtual environment, the more expensive it may be to replace, and thus resulting in the machine learning model outputting a higher the insurance premium.

In some embodiments, the prevalence of a virtual item may be based upon the prevalence of updates to and/or other features of the virtual item. In an example related to a virtual space ship that has been upgraded to be nuclear powered, the prevalence may be based upon a prevalence of the nuclear-power upgrade (with the specific space ship type and/or generally across all space ships in the virtual environment). In another example for characters, the prevalence may be based upon a prevalence of characters having a particular experience level.

The initial cost of the virtual item may also influence the insurance premium output by the machine learning model. For example, the higher the initial cost of the virtual item, the higher the replacement cost will be, and thus the machine learning model may output a higher insurance premium.

Updates and/or modifications to the virtual item may also influence the insurance premium output by the machine learning model. The updates and/or modifications may be made by the operator of the virtual environment and/or the owners of the virtual item. For example, if a virtual house is updated by applying a rare exterior design, this may increase the value of the virtual house, and thus the machine learning model may increase the output insurance premium. In another example, if a virtual space ship is modified to be nuclear powered, this may increase the value of the virtual spaceship, and thus the machine learning model may increase the output insurance premium. As another example, the operator of the virtual environment may have decreased the desirability of the virtual item (e.g., by decreasing the effectiveness and/or aesthetic appeal of the virtual item). As a result, the machine learning model may decrease the output insurance premium for items that have been made less valuable by the update and/or modification.

The availability of the virtual item may also influence the insurance premium output by the machine learning model. For example, it may be that a virtual item is readily available (e.g., the virtual item is available for purchase at any time). On the other hand, however, it may also be that the virtual item is difficult to acquire in the virtual environment. For example, it may be that the virtual item is a rare reward for performing a task within the virtual environment (e.g., completing a difficult challenge, opening a loot box, etc.), thus making the virtual item less available.

The cost of a similar virtual items may influence the insurance premium. For example, two virtual cars may be the same, except that they have different colors (e.g., red and green); and thus the two virtual cars are similar. In this example, the machine learning algorithm may use, for example, information of the red cars to predict insurance premiums for the green cars based upon the similarity therebetween. This is particularly useful when data of a particular virtual item is scarce or difficult to acquire (e.g., if green cars are particularly rare, but red cars are commonly available).

The cost of real-world items corresponding to virtual items may also influence the insurance premium output by the machine learning model. For example, it may be that a real-world house with a three car garage costs more than a house with a two car garage, and thus the machine learning model may output a higher premium for a virtual house with a three car garage, as opposed to a two car garage. As another example, the virtual item may be a branded virtual item corresponding to a maker of real-world items. Accordingly, the machine learning model may output a higher insurance premium for virtual items associated with brands that are perceived to be of higher value.

The experience level of a character may also influence the insurance premium output by the machine learning model. For example, the virtual environment server may dictate that a higher level experience character be more costly to replace than a lower experience level character.

The capability level of a virtual item may also influence the insurance premium output by the machine learning model. Examples of capability levels include a strength level of a virtual character, a dexterity level of a virtual character, an intelligence level of a virtual character, a maximum speed of a virtual vehicle, an acceleration capacity of a virtual vehicle, etc.

It should be appreciated that while the foregoing sets out some input factors to the machine learning model, in other embodiments, additional, alternate, or fewer factors are used. In some embodiments, an input to the machine learning model trained at block 420 may be the output of another machine learning model trained to produce a metric characterizing the virtual item. For example, the more desirable a virtual item is, the more others may be tempted to engage in fraudulent behavior to misappropriate the virtual item from the owner. In this example, an output of machine learning model trained to produce a desirability metric may be an input to the machine learning model trained at block 420.

At block 416 the machine learning training application 128 may extract features from the received data, and put them into vector form. For example, the features may correspond to the values associated with the historical data used as input factors. Furthermore, at block 416, the received data may be assessed and cleaned, including handling missing data and handling outliers. For example, missing records, zero values (e.g., values that were not recorded), incomplete data sets (e.g., for scenarios when data collection was not completed), outliers, and inconclusive data may be removed.

Block 420 may include sub-blocks 422 and 426. At block 422, the machine learning (ML) model is trained (e.g. based upon the data received from block 410). In some embodiments where historical insurance premiums are included in the historical information, the ML model "learns" an algorithm capable of calculating or predicting the target feature values (e.g., determining an insurance premium for one or more virtual items) given the predictor feature values. However, in other embodiments where historical insurance premiums are not available, the machine learning algorithm may learn to instead predict a cost at a time of loss of the virtual item (and/or other values upon which an insurance premium is based). The predicted cost may then in turn be used to determine the insurance premium. In one such working example, the machine learning algorithm is trained by creating multiple regression models to predict the cost at a time of loss of the virtual item, and then selecting the best regression model (e.g., the regression model with the least error, etc.). In these embodiments, the output of this first machine learning algorithm (e.g., the cost of the time of loss of the virtual item) may then input into a second model (e.g., a second machine learning algorithm, a regression model, a lookup table, etc.) to determine the insurance premium. For example, the model may be a machine learning algorithm that has been trained to determine insurance premiums from costs of real world items at a time of loss and/or other inputs.

Additionally, the machine learning model may include multiple layers. For example, in a first layer, the machine learning model may be configured to segment the one or more virtual into individual virtual items, and/or to identify and/or label virtual items. For example, the first layer may identify a type of virtual item (e.g., a virtual character, house, car, or spaceship, etc.). In this example, the second layer may then be configured to analyze the virtual item based upon the type (e.g., character analyzed based upon experience level, car analyzed based upon prevalence of in the virtual environment, etc.).

At block 426, the machine learning training application 128 evaluates the machine learning model, and determines whether or not the machine learning model is ready for deployment.

Further regarding block 426, evaluating the model sometimes involves testing the model using testing data or validating the model using validation data. Testing/validation data typically includes both predictor feature values and target feature values (e.g., including known inputs and outputs), enabling comparison of target feature values predicted by the model to the actual target feature values, enabling one to evaluate the performance of the model. This testing/validation process is valuable because the model, when implemented, will generate target feature values for future input data that may not be easily checked or validated.

Thus, it is advantageous to check one or more accuracy metrics of the model on data for which the target answer is already known (e.g., testing data or validation data, such as data including historical information associated with the one or more virtual items), and use this assessment as a proxy for predictive accuracy on future data. Exemplary accuracy metrics include key performance indicators, comparisons between historical trends and predictions of results, cross-validation with subject matter experts, comparisons between predicted results and actual results, etc.

At block 430, the machine learning training application 128 runs the ML model. For example, information associated with the one or more virtual items may be routed to the trained machine learning algorithm to determine the insurance premium.

Exemplary Methods for Providing Insurance for One or More Virtual Items

FIG. 5 shows an exemplary computer-implemented method or implementation 500 of providing insurance for one or more virtual items. The exemplary implementation 500 may begin at optional block 510 when the one or more processors 120 receive historical information of historical virtual items (e.g., from the virtual environment server 160 and/or the database 190).

At optional block 520, the one or more processors 120 may train a machine learning algorithm using the received historical information of the historical virtual items.

At block 530, the one or more processors 120 receive a request to purchase insurance for the one or more virtual items.

At block 540, the one or more processors 120 query a virtual environment server for information associated with the one or more virtual items.

At block 550, the one or more processors 120 receive the information associated with the one or more virtual items.

At block 560, the one or more processors 120 determine an insurance premium for the one or more virtual items based upon the received information.

At block 570, the one or more processors 120 send an insurance quote including the determined insurance premium to the customer computing device.

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Additional Exemplary Embodiments for Providing Insurance for One or More Virtual Items In one aspect, a computer-implemented method for insurance of one or more virtual items in a virtual environment may be provided. The method may include: (1) receiving, via one or more processors and from a customer computing device, a request to purchase insurance for the one or more virtual items; (2) in response to receiving the request, querying, via the one or more processors, a virtual environment server for information associated with the one or more virtual items; (3) receiving, via the one or more processors, from the virtual environment server, the information associated with the one or more virtual items; (4) determining, via the one or more processors, an insurance premium for the one or more virtual items based upon the received information; and/or (5) sending, via the one or more processors, an insurance quote including the determined insurance premium to the customer computing device. The method may include additional, fewer, or alternate actions, including those discussed elsewhere herein.

In some embodiments, the information associated with the one or more virtual items includes: (i) a prevalence of the one or more virtual items in the virtual environment, (ii) an initial cost of the one or more virtual items that the one or more virtual items were initially purchased for, (iii) updates and/or modifications to the one or more virtual items, (iv) an availability of the one or more virtual items, (v) a cost of a similar one or more virtual items similar to the one or more virtual items, (vi) a cost of one or more real-world items corresponding to one or more virtual items, (vii) an experience level of the one or more virtual items, and/or (viii) a capability level of one or more virtual items.

In some embodiments, the one or more virtual items include a virtual: character, house, vehicle. In certain embodiments, the one or more virtual items include a character; and/or the information of the one or more virtual items includes an experience level of the character.

In some embodiments, the method may include: (i) receiving, via the one or more processors, updated information associated with the one or more virtual items; and/or (ii) sending, via the one or more processors, based upon the updated information, an offer to purchase insurance for the virtual item to the customer computer device.

In some embodiments, the one or more virtual items include a character; and/or the insurance of the one or more virtual items is an insurance policy triggered to take effect upon the character attaining a predetermined character experience level.

In some embodiments, the customer computing device comprises a virtual reality (VR) headset. In certain embodiments, the customer computing device comprises a vender server; and/or the one or more virtual items are included in an inventory of items offered via the vendor server.

In some embodiments, determining the insurance premium comprises: receiving, via the one or more processors, historical information of historical virtual items including historical insurance premiums; and/or routing, via the one or more processors, the received information associated with the one or more virtual items to a machine learning algorithm that is (i) trained using historical information related to virtual items, and (ii) configured to output data upon which the insurance premium determination is based.

In some embodiments, the historical information includes: (i) a prevalence of the one or more historical virtual items in the virtual environment, (ii) an initial cost of the one or more historical virtual items that the one or more virtual items were initially purchased for, (iii) updates and/or modifications to the one or more historical virtual items, (iv) an availability of the one or more historical virtual items, (v) a cost of a similar one or more historical virtual items similar to the one or more virtual items, (vi) a cost of one or more real-world items corresponding to one or more historical virtual items, (vii) an experience level of the one or more historical virtual items, (viii) a capability level of one or more historical virtual items, (ix) historical insurance premiums of historical virtual items, and/or (x) costs of virtual items at times of losses.

In another aspect, a computer system configured to provide insurance of one or more virtual items in a virtual environment may be provided. The computer system may include one or more processors configured to: (1) receive from a customer computing device, a request to purchase insurance for the one or more virtual items; (2) in response to receiving the request, query, a virtual environment server for information associated with the one or more virtual items; (3) receive from the virtual environment server, the information associated with the one or more virtual items; (4) determine an insurance premium for the one or more virtual items based upon the received information; and/or (5) send an insurance quote including the determined insurance premium to the customer computing device. The computer system may include additional, less, or alternate functionality, including that discussed elsewhere herein.

In some embodiments, the information associated with the one or more virtual items includes: (i) a prevalence of the one or more virtual items in the virtual environment, (ii) an initial cost of the one or more virtual items that the one or more virtual items were initially purchased for, (iii) updates and/or modifications to the one or more virtual items, (iv) an availability of the one or more virtual items, (v) a cost of a similar one or more virtual items similar to the one or more virtual items, (vi) a cost of one or more real-world items corresponding to one or more virtual items, (vii) an experience level of the one or more virtual items, and/or (viii) a capability level of one or more virtual items.

In some embodiments, the one or more virtual items include a virtual: character, house, or vehicle. In certain embodiments, the one or more virtual items include a character; and/or the information associated with the one or more virtual items includes an experience level of the character.

In some embodiments, the one or more processors are further configured to determine the insurance premium by: receiving historical information of historical virtual items including historical insurance premiums; and/or routing the received information associated with the one or more virtual items to a machine learning algorithm that is (i) trained using historical information related to virtual items, and (ii) configured to output data upon which the insurance premium determination is based.

In yet another aspect, a computer device configured to provide insurance of one or more virtual items in a virtual environment may be provided. The computer device may include: one or more processors; and/or one or more memories coupled to the one or more processors. The one or more memories including computer executable instructions stored therein that, when executed by the one or more processors, may cause the one or more processors to: (1) receive from a customer computing device, a request to purchase insurance for the one or more virtual items; (2) in response to receiving the request, query, a virtual environment server for information associated with the one or more virtual items; (3) receive from the virtual environment server, the information associated with the one or more virtual items; (4)

determine an insurance premium for the one or more virtual items based upon the received information; and/or (5) send an insurance quote including the determined insurance premium to the customer computing device. The computer device may include additional, less, or alternate functionality, including that discussed elsewhere herein.

In some embodiments, the information associated with the one or more virtual items includes: (i) a prevalence of the one or more virtual items in the virtual environment, (ii) an initial cost of the one or more virtual items that the one or more virtual items were initially purchased for, (iii) updates and/or modifications to the one or more virtual items, (iv) an availability of the one or more virtual items, (v) a cost of a similar one or more virtual items similar to the one or more virtual items, (vi) a cost of one or more real-world items corresponding to one or more virtual items, (vii) an experience level of the one or more virtual items, and/or (viii) a capability level of one or more virtual items.

In some embodiments, the one or more virtual items include a virtual: character, house, car, or spaceship. In certain embodiments, the one or more virtual items include a character; and/or the information associated with the one or more virtual items includes an experience level of the character.

In some embodiments, the one or more memories including computer executable instructions stored therein that, when executed by the one or more processors, further cause the one or more processors to determine the insurance premium by: receiving historical information of historical virtual items including historical insurance premiums; and/or routing the received information associated with the one or more virtual items to a machine learning algorithm that is (i) trained using historical information related to virtual items, and (ii) configured to output data upon which the insurance premium determination is based.

Exemplary System for Providing Backup of a Virtual Item

Figure 6:
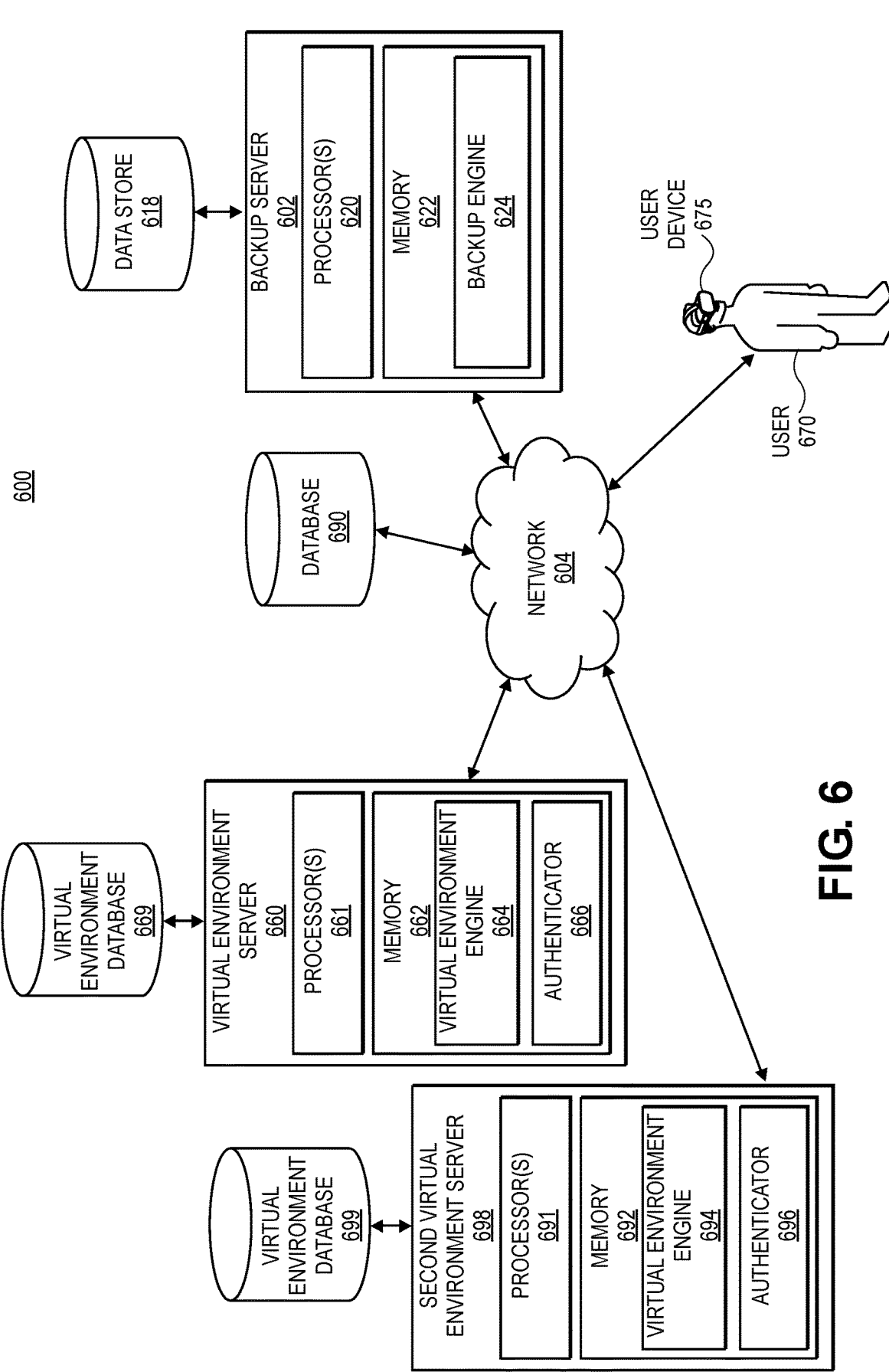
FIG. 6 depicts an exemplary system for providing a backup of a virtual item, according to one embodiment.

FIG. 6 shows an exemplary computer system 600 for providing a backup of a virtual item in which the exemplary computer-implemented methods described herein may be implemented. The high-level architecture includes both hardware and software applications, as well as various data communications channels for communicating data between the various hardware and software components.

Broadly speaking, a virtual environment, such as a metaverse, may be provided by the virtual environment server 660. The virtual environment may allow user-controlled characters (e.g., as represented by avatars in the virtual environment) to traverse the virtual world, interact with each other, gain experience, make purchases for real or virtual items, etc. As referred to herein, purchases refer to purchases made in traditional currency (e.g., U.S. dollars, Euros, etc.), cryptocurrency (e.g., Bitcoin, etc.), virtual currency (e.g., a currency used solely in the virtual world), and/or in exchange for other real or virtual items.

The virtual environment may be provided by the virtual environment server 660. The virtual environment server 660 may include one or more processors 661 such as one or more microprocessors, controllers, and/or any other suitable type of processor. The virtual environment server 660 may further include a memory 662 (e.g., volatile memory, non-volatile memory) accessible by the one or more processors 661, (e.g., via a memory controller). The one or more processors 661 may interact with the memory 662 to obtain and execute, for example, computer-readable instructions stored in the memory 662. Additionally or alternatively, computer-readable instructions may be stored on one or more removable media (e.g., a compact disc, a digital versatile disc, removable flash memory, etc.) that may be coupled to the virtual environment server 660 to provide access to the computer-readable instructions stored thereon.

In particular, the computer-readable instructions stored on the memory 662 may include instructions for executing various applications, such as virtual environment engine 664, and/or an authenticator 666.

In operation, the virtual environment engine 664 may provide the virtual environment. For example, as described elsewhere herein, the virtual environment engine 664 may provide the virtual environment to users such that characters may travel through the virtual environment, interact with each other, gain experience, make purchases, etc.

For instance, a user 670 may wish to participate in the virtual environment. To do so, the user 670 may use user device 675 (e.g., a virtual reality (VR) headset, a computer, a tablet, a smartphone, an augmented reality (AR) headset, a server, etc.) to access the virtual environment. In this way, the user device 675 may create a character to interact with the virtual environment.

The virtual environment engine 664 may store information of the character in the memory 662 and/or the virtual environment database 669. Furthermore, the memory 662 and/or the virtual environment database 669 may store any information related to the virtual environment. For example, the memory 662 and/or the virtual environment database 669, may store information of: characters, buildings, objects (e.g., vehicles, items of the characters, such as tools, weapons, etc.), businesses (e.g., insurance business, such as an insurance business that backup server 602), etc.

To access the virtual environment, in some examples, the user 670 must be authenticated. To this end, the authenticator 666 may authenticate the user 670. As will be described elsewhere herein, the authentication may be based on authentication credentials, such as biometric data received from the user device 675 (e.g., a VR headset automatically gathers biometric data and sends it as part of the authentication process).

Additionally or alternatively to authenticating the user 670, the authenticator 666 may authenticate the backup server 602. Once authenticated, in some embodiments, the backup server 602 may be permitted by the virtual environment server 660 to provide backups of virtual items to users of the virtual environment (e.g., user 670).

The backup server 602 may include one or more processors 620 such as one or more microprocessors, controllers, and/or any other suitable type of processor. The backup server 602 may further include a memory 622 (e.g., volatile memory, non-volatile memory) accessible by the one or more processors 620, (e.g., via a memory controller). The one or more processors 620 may interact with the memory 622 to obtain and execute, for example, computer-readable instructions stored in the memory 622. Additionally or alternatively, computer-readable instructions may be stored on one or more removable media (e.g., a compact disc, a digital versatile disc, removable flash memory, etc.) that may be coupled to the backup server 602 to provide access to the computer-readable instructions stored thereon. In particular, the computer-readable instructions stored on the memory 622 may include instructions for executing various applications, such as backup engine 124.

In some embodiments, the backup server 602 may provide backups of virtual items to a user of the virtual environment, such as the user 670. For example, with reference to the example virtual environment 200 of FIG. 2, the user 670 may have the virtual: character 210, car 220, house 230, and spaceship 240. In this example, the backup server 602 may provide backups to the user 670 for any of the virtual items (e.g., the virtual character 210, car 220, house 230, and/or spaceship 240). However, it should be appreciated that these are simply examples, and the backup server 602 may provide backups to the user 670 for any kind of virtual item.

To this end, and as will be described further below, the backup engine 624 may receive a request to backup a virtual item (e.g., from the user device 675 or the virtual environment server 660). The backup engine 624 may then obtain data associated with the virtual item, and then write the data to the data store 618 to create the backup of the virtual item.

In some embodiments, the backup engine 624 periodically (e.g., every hour, every day, every week, every month, every other month, etc.) creates a complete backup of the virtual item. Advantageously, in some embodiments, previous backups maintained to provide a broad range of backup options of the virtual item, thereby improving technical functioning. In this regard, in some of these embodiments, when the user 670 desires to restore the virtual item, she may select from any or all of the created complete backups of the virtual item.

In addition, some embodiments involve aspects of interoperability between virtual environments. In this regard, the virtual environment provided by the virtual environment server 660 may be a first virtual environment, and the exemplary system 100 may further include a second virtual environment provided by the second virtual environment server 698. The second virtual environment server 698 may include one or more processors 691 such as one or more microprocessors, controllers, and/or any other suitable type of processor. The second virtual environment server 698 may further include a memory 692 (e.g., volatile memory, non-volatile memory) accessible by the one or more processors 691, (e.g., via a memory controller). The one or more processors 691 may interact with the memory 692 to obtain and execute, for example, computer-readable instructions stored in the memory 692. Additionally or alternatively, computer-readable instructions may be stored on one or more removable media (e.g., a compact disc, a digital versatile disc, removable flash memory, etc.) that may be coupled to the second virtual environment server 698 to provide access to the computer-readable instructions stored thereon. In particular, the computer-readable instructions stored on the memory 692 may include instructions for executing various applications, such as virtual environment engine 694, and/or an authenticator 696.

In operation, the virtual environment engine 694 may provide the second virtual environment. For example, as described elsewhere herein, the virtual environment engine 664 may provide the second virtual environment to users such that characters may travel through the second virtual environment, interact with each other, gain experience, make purchases, etc.

For instance, a user 670 may wish to participate in the second virtual environment. To do so, the user 670 may use user device 675 (e.g., a virtual reality (VR) headset, a computer, a tablet, a smartphone, an augmented reality (AR) headset, a server, etc.) to access the second virtual environment. In this way, the user device 675 may create a character to interact with the second virtual environment.

The virtual environment engine 694 may store information of the character in the memory 692 and/or the virtual environment database 699. Furthermore, the memory 692 and/or the virtual environment database 699 may store any information related to the virtual environment. For example, the memory 692 and/or the virtual environment database

699, may store information of: characters, buildings, objects (e.g., vehicles, items of the characters, such as tools, weapons, etc.), businesses (e.g., insurance business, such as an insurance business that backup server 602), etc.

To access the second virtual environment, in some examples, the user 670 must be authenticated. To this end, the authenticator 696 may authenticate the user 670. The authentication may be based on authentication credentials, such as biometric data received from the user device 675 (e.g., a VR headset automatically gathers biometric data and sends it as part of the authentication process).

Moreover, in some embodiments, a single database (e.g., external database 690) may hold data that may be used for either the first virtual environment or the second virtual environment. This has particular applicability to fungible items (e.g., a particular virtual TV could exist in either the first or second virtual environments).

Additionally or alternatively to authenticating the user 670, the authenticator 696 may authenticate the backup server 602. Once authenticated, in some embodiments, the backup server 602 may be permitted by the second virtual environment server 698 to provide backups of virtual items to users of the second virtual environment (e.g., user 670).

What's more, the system 600 may advantageously be used to capture or recreate a childhood home or other place of nostalgic value, which may be used to provide a therapeutic benefit (e.g., to people with Dementia or Alzheimer's).

In addition, further regarding the example system 600, the illustrated example components may be configured to communicate, e.g., via a network 604 (which may be a wired or wireless network, such as the internet), with any other component. Furthermore, although the example system 600 illustrates only one of each of the components, any number of the example components are contemplated (e.g., any number of users, user devices, virtual environment servers, second virtual environment servers, databases, backup servers, etc.).

Figure 7:
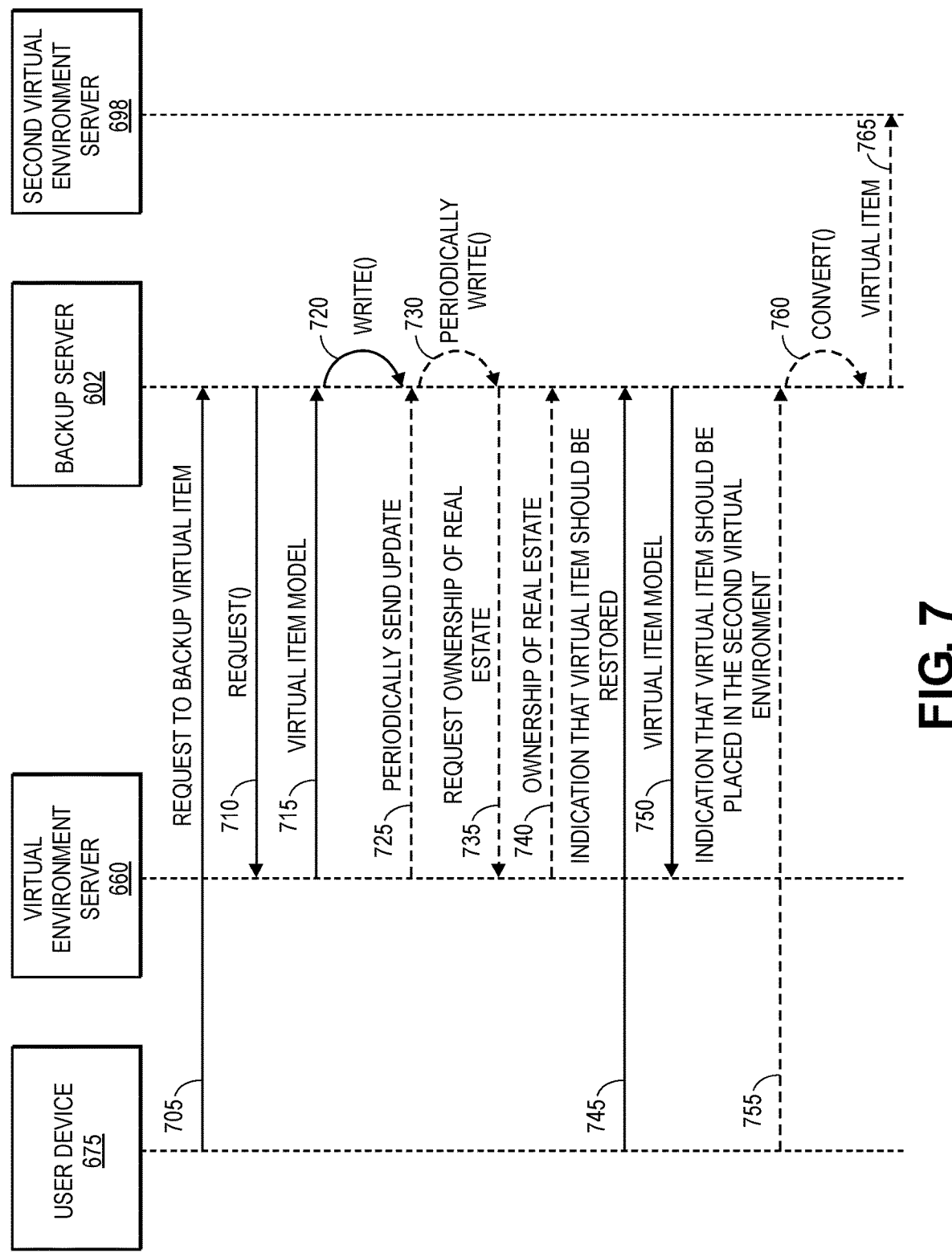
FIG. 7 depicts an exemplary signal diagram for providing backup of a virtual item, including requesting a virtual item template, according to one embodiment.

Exemplary Signal Diagram Illustrations of Exemplary Provision of Backup of a Virtual Item FIG. 7 illustrates an exemplary signal diagram 700 for providing backups for virtual items, including querying the virtual environment server 660 for the virtual item, according to an embodiment. More particularly, the signal diagram 700 illustrates the signals exchanged and/or detected by various components of a system for providing backups of virtual items, such as the example system 600.

The signal diagram 700 begins when the user device 675 sends (705) a request to the backup server 602 to backup the virtual item. In some embodiments, the request includes an identifier of the virtual item, an identifier of the user device 675, and/or an identifier of the user 670.

In response to receiving the request, the backup server 602 transmits a request (710) the virtual environment server 660 for a virtual item model associated with the virtual item.

In response to the request, the virtual environment server 660 sends (715) the virtual item model to the backup server 602.

In response to the receiving the virtual item model, the backup server 602 writes (720) (e.g., via the backup engine 624) the virtual item model to the data store 618. Additionally or alternatively, the virtual item model may be temporarily written to the memory 622.

Optionally, the virtual environment server 660 may periodically (e.g., every hour, every day, every week, every month, every other month, etc.) send (725) an updated virtual item model associated with an updated version of the virtual item to the backup server 602. Once the updated virtual item model is received, the backup server may extract data from the virtual item model. The updated virtual item model associated with the updated version of the virtual item may be used to create a complete new backup of the virtual item to be stored in the data store 618 (e.g., by periodically, such as by each time the updated virtual item model associated with the updated version of the updated virtual item is received, writing a new virtual item model to the data store 618 at 730). Advantageously, this improves technical functioning by creating a broader range of backup options of the virtual item. In this regard, in some embodiments, when the user 670 desires to restore the virtual item, the backup server 602 may send the user device 675 updated virtual item models (e.g., along with the times and/or dates that they were created), thereby allowing the user 670 to select a particular version of the virtual item.

In some variations, the backup server 602 uses the updated virtual item model to identify changes to the virtual item model, and write the changes to the data store 618. In other variations, the backup server 602 overwrites the virtual item model with the updated virtual item model in the data store 618. Thus, these variations have the technical advantage of using less storage space in the data store 618.

Optionally, the backup server 602 may also request (735) ownership of virtual real estate from the virtual environment server 660. In response to the request, the virtual environment server 660 may then optionally send (740) ownership of the request virtual real estate to the backup server 602. In some embodiments, the backup server 602 then uses this virtual real estate to restore virtual items. For example, if the virtual item is a virtual house, and the virtual house was destroyed (e.g., in a house fire, natural disaster, etc.) in the virtual environment, the backup server 602 may use the real estate along with the backed up virtual item model (e.g., stored in the data store 618) to enable restoration of the house to the real estate.

At 745, an indication that the virtual item may should be restored is sent from the user device 675 to the backup server 602. Additionally or alternatively, the indication may be sent from the virtual environment server 660 to the backup server 602.

In some embodiments, the indication may be sent in response to a detection that data of the virtual item has been corrupted (e.g., the virtual environment server 660 and/or user device 675 detects that the data of the virtual item has been corrupted, and, in response, the virtual environment server 660 and/or user device 675 sends the indication to the backup server 602).

Additionally or alternatively, the indication may be sent in response to a detection that data of the virtual item has been lost (e.g., the virtual environment server 660 and/or user device 675 detects that the data of the virtual item has been lost, and, in response, the virtual environment server 660 and/or user device 675 sends the indication to the backup server 602).

Additionally or alternatively, the indication may be sent in response to a detection that security at the virtual environment server 660 has been breached (e.g., the virtual environment server 660 and/or user device 675 detects the security breach, and, in response, the virtual environment server 660 and/or user device 675 sends the indication to the backup server 602).

Additionally or alternatively, the indication may be sent in response to a virtual environment event. For example, the virtual item may be a virtual house, and the event may be a house fire that damages or destroys the house. In this example, the user device 675 and/or backup server 602 may detect that the house has been damaged or destroyed in the house fire, and, in response, send the indication to the backup server 602. In this example, the house may be restored either to its original location in the virtual environment, or to a different virtual location (e.g., the virtual real estate requested at 735). Virtual environment events may be any events that occur within the virtual environment, and that destroy or damage the virtual item. Examples of virtual environment events include virtual: natural disasters (e.g., tornados, hurricanes, floods, earthquakes, fires, etc.), pandemics (e.g., a virtual pandemic kills the virtual character), wars, murders, robberies, vandalisms, etc.

At 750, in response to receiving the indication that the virtual item should be restored, the backup server 602 sends the virtual item model to the virtual environment server 660, thereby allowing the virtual environment server 660 to restore the virtual item to the virtual environment. Furthermore, in some embodiments, at 750, the virtual item model is sent along with a location in the virtual environment that the virtual item should be restored to. For example, the backup server 602 may obtain (e.g., from the virtual environment server 660 or the user device 675) information that the backup server 602 may use to determine a location in the virtual environment to which it is optimal to restore the virtual item. For example, if the virtual item is a virtual vehicle, the backup server 602 may determine to restore the virtual vehicle to a garage, a parking lot, a car dealership, a generic vehicle pickup location, etc. In another example, if the virtual item is a virtual character, the backup server 602 may determine to restore the virtual character to a virtual house, a city center, etc. In some embodiments, rather than determine the restore location, the backup server 602 obtains the restore location from the virtual environment server 660 or the user device 675.

However, it should be noted that 750 is not performed in some variations. For example, as will be described further below, the user 670 may wish to restore the virtual item to a different virtual environment (e.g., controlled by the second virtual environment server 698, etc.). Thus, in some such examples, 750 may not be performed.

In some examples, the user 670 may wish that the virtual item be restored to a different virtual environment. For example, the user 670 may have a virtual item in a first virtual environment provided by the virtual environment server 660, and the virtual environment server 660 may be physically destroyed so that the first virtual environment itself no longer exists. In this example, the user 670 may still be able to recover her virtual item by restoring the virtual item to a different virtual environment, such as a second virtual environment provided by the second virtual environment server 698.

Additionally or alternatively, the user 670 may simply want her virtual item placed into another virtual environment.

To this end, the user device 675 may optionally send (755) an indication that the virtual item should be placed in the second virtual environment to the backup server 602. In response, the backup server 602 may optionally attempt to convert (760) the data associated with the virtual item (e.g., stored in the data store 618). If the conversion is not successful, the backup server 602 may optionally send (765) an indication to the user device 675 that the conversion was not successful (not shown in FIG. 7). If the conversion was successful, the backup server 602 may send the virtual item (e.g., the converted data associated with the virtual item) to the second virtual environment server 698, to thereby allow the second virtual environment server 698 to create the virtual item in the second virtual environment.

Figure 8:
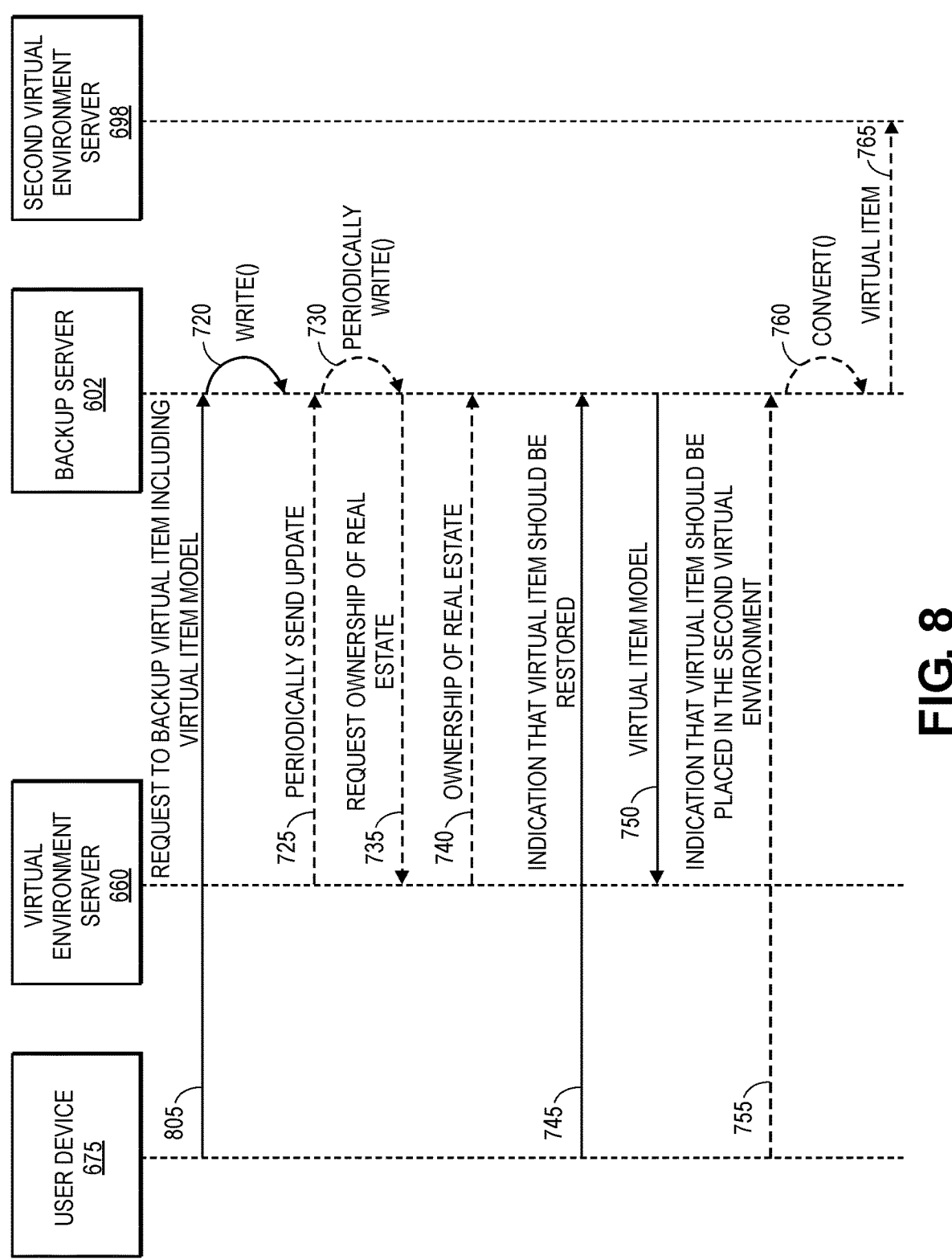
FIG. 8 illustrates an exemplary signal diagram for providing backups for virtual items, including that the request to backup the virtual item includes data associated with the virtual item, according to one embodiment.

FIG. 8 illustrates an exemplary signal diagram 800 for providing backups for virtual items. More particularly, the signal diagram 800 illustrates the signals exchanged and/or detected by various components of a system for providing backups of virtual items, such as the example system 600. Unlike the signal diagram 700 of FIG. 7, the request to backup the virtual item includes data associated with the virtual item.

The signal diagram 800 begins when the user device 675 sends (805) a request to the backup server 602 to backup the virtual item and a virtual item model associated with the virtual item. In some embodiments, the request further includes an identifier of the virtual item, an identifier of the user device 675, and/or an identifier of the user 670. In the example signal diagram 800, the user device 675 sends the request; however, additionally or alternatively, the virtual environment server 660 may send the request along with the virtual item model associated with the virtual item.

Because the request sent at 805 includes the virtual item model, there is no need for the backup server 602 to request the virtual item model from the virtual environment server 660, as in 710 of FIG. 7. Thus, the example of FIG. 8 has a technical advantage over the example of FIG. 7. Namely, less signals must be sent through the system to create the backup(s) of the virtual item. For example, 705, 710 and 715 (illustrated in FIG. 7) are not necessary in FIG. 8 because the request sent at 805 of FIG. 8 includes the virtual item model.

In the example signal diagram 800, events 720-765 may occur substantially as in the example signal diagram 700.

Figure 9:
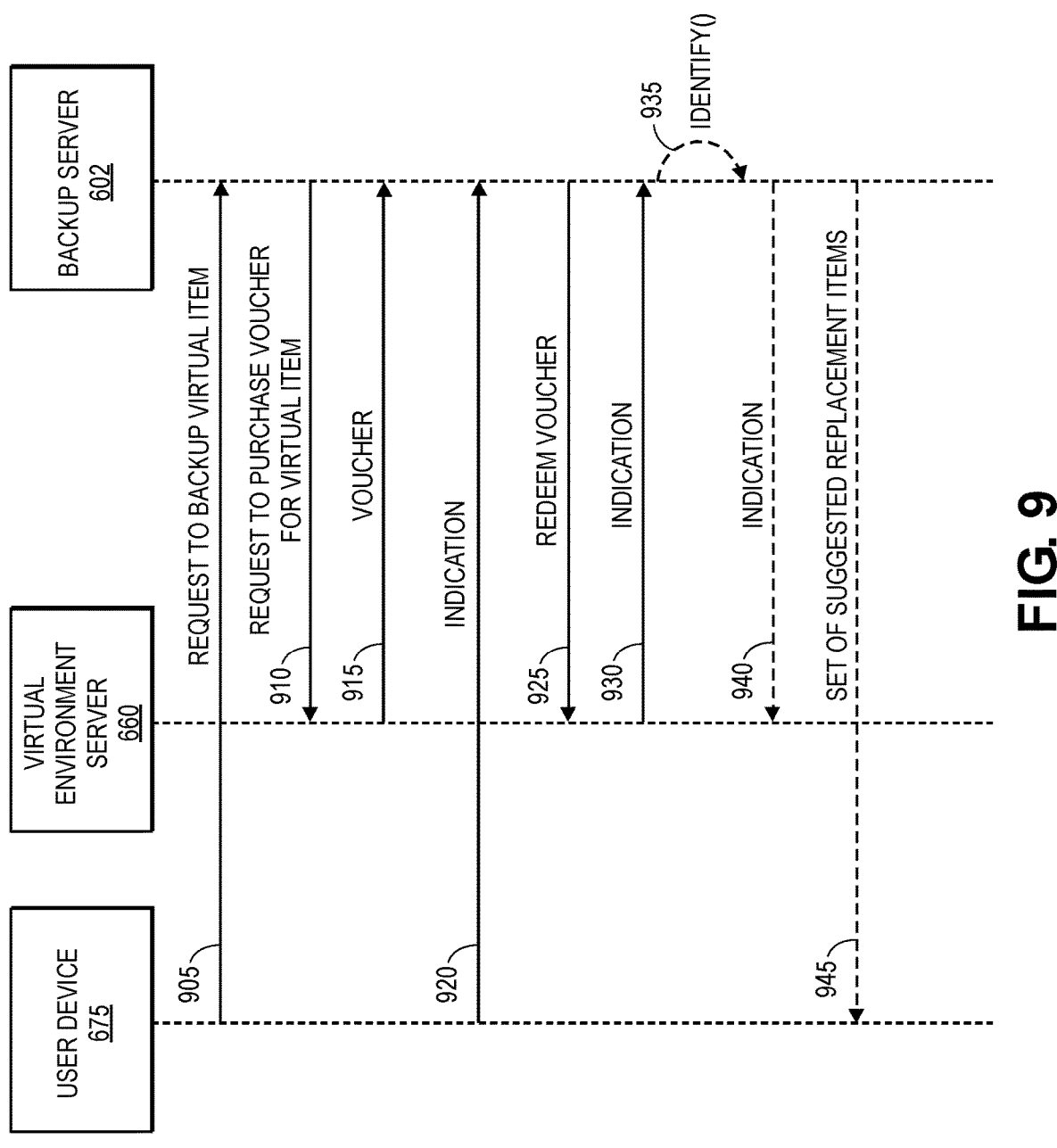
FIG. 9 illustrates an exemplary signal diagram for providing backups for fungible virtual items, according to one embodiment.

Moreover, it should be understood that the examples of FIGS. 8 and 9 apply broadly to both fungible and non-fungible virtual items. However, certain embodiments apply more specifically to backing up fungible items. In this regard, FIG. 9 illustrates an example signal diagram 900 for providing backups for fungible virtual items, according to an embodiment. More particularly, the signal diagram 900 illustrates the signals exchanged and/or detected by various components of a system for providing backups of virtual items, such as the example system 600.

In this regard, in some examples, the user 670 may wish to obtain backups for fungible items. For example, the user 670 may wish to backup fungible items that are inside a virtual house owned by the user 670. For instance, the user 670 may have a virtual house that includes fungible items, such as virtual: electronics (e.g., televisions (TVs), stereos, etc.), furniture, mattresses, bedframes, appliances, etc. If the virtual house is lost, for example, in a virtual event (e.g., a virtual fire) or a real world event (e.g., data corruption destroying a profile of the user 670 that included the virtual item, the virtual environment server 660 is hacked resulting in loss of the profile of the user 670, etc.), the user 670 may wish to restore the house including the fungible items.

However, in some scenarios, because the virtual environment server 660 controls the distribution of the fungible virtual items, the backup server uses a voucher (e.g., provided by the virtual environment server 602) to restore the fungible virtual item. In this regard, the voucher may be a code that represents a right to purchase virtual item(s) (e.g., from the virtual environment server 660), possibly at a certain price.

The signal diagram 900 begins when the user device 675 sends a request (905) to the backup server 602 to backup a virtual item. The request may be for a single virtual item, or be a request that includes a list of virtual items (e.g., a list of virtual items that are included in a virtual house). In some embodiments, the request includes (i) an identifier of the virtual item, and/or (ii) an identifier of a user that owns the virtual item (e.g., user 670).

In response to receiving the request to backup the virtual item, the backup server 602 may send (910) a request to purchase a voucher for the virtual item to the virtual environment server 660. The request may be sent along with payment for the voucher.

In response to receiving the request to purchase the voucher, the virtual environment server 660 may send (915) the voucher to the backup server 602. Additionally or alternatively, the virtual environment server 660 may record (e.g., in the virtual environment database 669 and/or a distributed ledger) that the backup server 602 now owns the voucher. Recording an indication on a distributed ledger that the voucher is owned by the backup server 602 rather than sending the voucher to the backup server 602 advantageously improves technical functioning. In particular, the system saves bandwidth (e.g., because the voucher does not have to be sent to the backup server 602), and the backup server 602 saves storage space (e.g., because it does not have to store the voucher).

At event 920, the user device 675 sends an indication to the backup server that the virtual item should be restored to the virtual environment. In some examples, the indication may be an indication that only the virtual should be restored to the virtual environment. However, in other examples, the indication may include a list of virtual items to be restored including the virtual item. In yet other examples, the indication does not specifically list the virtual item; for instance, the indication may indicate simply to restore all virtual items that were lost in a house from a house fire. In this example, it may be noted that the virtual item is a smaller virtual item included in a larger virtual item (e.g., the larger virtual item being the virtual house).

In some variations, rather than the indication including a list, the virtual item model references other virtual items. For example, a virtual item model of a vehicle may reference other virtual items that are add-ons to the vehicle. That way, the backup server 602 can take action to ensure that the referenced other virtual items are backed up and/or restored as well (e.g., the virtual vehicle is restored with its add-ons).

In response to receiving the indication that the virtual item should be restored, the backup server 602 may redeem (925) to use the voucher. In some embodiments, this includes sending the voucher to the virtual environment server 660. In some embodiments, the voucher is sent along with an instruction to auto-populate the virtual item into the user's 670 inventory. In other embodiments, the voucher is sent along with an instruction to provide a virtual voucher corresponding to the voucher to an inventory of the user 670 such that the user 670 can redeem the virtual voucher for the virtual item. In still other embodiments, no such instruction is sent along with the voucher, and the virtual environment server 660 independently determines if the virtual item should be auto-populated into the user's 670 inventory, or if the virtual voucher should be provided to the user 670.

In other variations (not illustrated in FIG. 9), rather than send the voucher to the virtual environment server 660, the backup server 602 sends the voucher to the user 670. In some such variations, the voucher comprises a unique code that the user may enter (e.g., via the user device 675 and/or via a user interface (UI) associated with the virtual environment) to redeem the voucher.

In variations where more than one virtual item is to be restored (e.g., a list was sent at 920, or a virtual item model includes references to other virtual items, at 925, the backup server 602 may also send vouchers for the other items (if it has them), or send indications that the other items to be restored as well.

At 930, the virtual environment server 660 sends an indication of if the voucher was applied or not. If the voucher was not applied, the virtual environment server 660 may also send a reason why (e.g., the virtual item is no longer available).

If the reason that the voucher was not applied is that the virtual item is no longer available, the backup server 602 may optionally identify 935 a replacement item for the virtual item. This may involve querying the virtual environment server 660 for potential replacement items. The determination may be made by any suitable technique. For example, the determination may be made based upon a type of the virtual item (e.g., TV) and/or characteristics of the virtual item (e.g., size of the TV). At optional event 940, the backup server 602 sends an indication to the virtual environment server to provide the replacement item to the user 670.

Alternatively, at 935, rather than identify only one replacement virtual item, the backup server 602 may identify a set of suggested replacement items. This may involve querying the virtual environment server 660 for potential replacement items. The identification may be made by any suitable technique. For example, the determination may be made based upon a type of the virtual item (e.g., TV) and/or characteristics of the virtual item (e.g., size of the TV). At optional event 945, the backup server 602 sends the set of suggested replacement items to the user device 675.

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Exemplary Methods for Providing Backup of a Virtual Item

FIG. 10 shows an exemplary computer-implemented method or implementation 1000 of providing a backup of a virtual item in a virtual environment.

The exemplary implementation 1000 may begin at block 1005 when the one or more processors 620 receive a request to backup a virtual item. The request may be received from the user device 675 and/or the virtual environment server 660. In some embodiments, the request includes a virtual item model associated with the virtual item.

At block 1010, the one or more processors 620 transmit a request to the virtual environment server 660 for a virtual item model associated with the virtual item. However, block 1010 is not performed in some embodiments where the request received at block 1005 includes the virtual item model.

At block 1015, in response to the request, the one or more processors 620 receive the virtual item model associated with the virtual item. However, block 1015 is not performed in some embodiments where the request received at block 1005 includes the virtual item model.

At block 1020, the one or more processors 620 write the virtual item model to a data store 618 associated with the backup server 602.

FIG. 11 shows an exemplary computer-implemented method or implementation 1100 of providing a backup of a virtual item in a virtual environment with particular applicability to fungible virtual items.

The exemplary implementation 1100 may begin at block 1105 when the one or more processors 620 receive a request to backup a virtual item. The request may be received from the user device 675 and/or the virtual environment server 660. In some embodiments, the request includes: (i) an identifier of the virtual item, and/or (ii) an identifier of a user that owns the virtual item.

At block 1110, the one or more processors 620 send, to the virtual environment server 660, a request for a voucher for the virtual item.

At block 1115, the one or more processors 620 receive the voucher from the virtual environment server 660.

At block 1120, the one or more processors 620 receive (e.g., from the user device 675, or the virtual environment server 660) an indication that the virtual item should be restored to the virtual environment.

At block 1125, the one or more processors 620, in response to receiving the indication that the virtual item should be restored to the virtual environment, redeem the voucher.

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Additional Exemplary Embodiments for Providing Insurance for One or More Virtual Items In one aspect, a computer-implemented method for providing a backup of a virtual item in a virtual environment may be provided. The method may include: (1) receiving, via one or more processors of a backup server, a request to backup the virtual item; (2) transmitting, via the one or more processors of the backup server and to a virtual environment server, a request for a virtual item model associated with the virtual item, wherein the virtual item model is configured to store data representative of the virtual item such that a virtual environment server is able to import the virtual item into a virtual environment; (3) receiving, via the one or more processors of the backup server and from the virtual environment server, the virtual item model; and/or (4) writing, via the one or more processors of the backup server, the virtual item model to a data store associated with the backup server. The method may include additional, fewer, or alternate actions, including those discussed elsewhere herein.

In some embodiments, the method further includes: receiving, via the one or more processors of the backup server, an indication that the virtual item should be restored to the virtual environment; and/or restoring, via the one or more processors of the backup server, the virtual item to the virtual environment by: retrieving the virtual item model from the data store associated with the backup server; and/or sending the virtual item model to the virtual environment server.

In some embodiments, the request to backup the virtual item is a periodic backup request; and/or the method further comprises: periodically receiving, via the one or more processors, an updated virtual item model associated with an updated version of the virtual item; and/or writing, via the one or more processors of the backup server, additional data corresponding to the updated virtual item model to the data store associated with the backup server.

In some embodiments, the method further includes extracting, via the one or more processors, the additional data from the updated virtual item model.

In some embodiments, the writing the additional data comprises writing an updated virtual item model virtual item in the data store associated with the backup server.

In some embodiments, the method further includes: (a) receiving, via the one or more processors of the backup server, an indication that the virtual item should be restored to the virtual environment; and/or (b) presenting, via the one or more processors of the backup server and to a user associated with the virtual item, a selection between: (i) a copy of the virtual item created from the virtual item model, and (ii) a copy of the virtual item created from the updated virtual item model.

In some embodiments, the virtual item is a virtual house, and wherein the method further comprises: requesting, via the one or more processors of the backup server, virtual real estate from the virtual environment server; and/or receiving, via the one or more processors of the backup server, ownership of the virtual real estate from the virtual environment server.

In some embodiments, the method further includes: (a) receiving, via the one or more processors of the backup server, an indication that the virtual house should be restored to the virtual environment; and/or (b) sending, via the one or more processors of the backup server and to the virtual environment server, a request to import the virtual item model for the virtual home at the virtual real estate.

In some embodiments, the virtual item is a virtual vehicle, and wherein the method further comprises: receiving, via the one or more processors, an indication that the virtual vehicle should be restored to the virtual environment; obtaining, via the one or more processors, a virtual location associated with a virtual character corresponding to the virtual vehicle; and/or sending, via the one or more processors, and to the virtual environment server, a request to import the virtual item model for the virtual vehicle at the virtual location associated with the virtual character corresponding to the virtual vehicle.

In some embodiments, the virtual item is a virtual character, and the method further comprises: receiving, via the one or more processors, an indication that the virtual character should be restored to the virtual environment; obtaining, via the one or more processors, an indication of a virtual restore location associated with the virtual character; and/or sending, via the one or more processors, and to the virtual environment server, a request to import the virtual item model for the virtual character at the virtual restore location.

In some embodiments, the virtual environment is a first virtual environment, the virtual environment server is a first virtual environment server, and the method further includes: receiving, via the one or more processors of the backup server, an indication that the virtual item should be restored to a second virtual environment.

In some embodiments, the method further includes: converting, via the one or more processors of the backup server, the virtual item model to a format operable to import the virtual item into the second virtual environment; and/or sending, via the one or more processors of the backup server and to the second virtual environment server, a request to import the converted virtual item model into the second virtual environment.

In some embodiments, the method further includes sending, via the one or more processors of the backup server and to the second virtual environment server, a request to import the virtual item model into the second virtual environment.

In another aspect, a computer-implemented method for providing a backup of a virtual item in a virtual environment may be provided. The method may include: (1) receiving, via one or more processors of a backup server, a request to backup the virtual item, wherein: (i) the request includes a virtual item model associated with the virtual item, and (ii) the request is received from either a virtual environment server that is a primary source of data for virtual items in the virtual environment, or a user device, and (iii) the request is received from either a virtual environment server that is a primary source of data for virtual items in the virtual environment, or a user device; and/or (2) in response to receiving the request, writing, via the one or more processors of the backup server, the virtual item model to a data store associated with the backup server. The method may include additional, fewer, or alternate actions, including those discussed elsewhere herein.

In some embodiments, the request to backup the virtual item is received from the virtual environment server.

In some embodiments, the request to backup the virtual item is received from the user device.

In some embodiments, the request to backup the virtual item is a periodic backup request; and/or the method further includes: periodically receiving, via the one or more processors, an updated virtual item model associated with an updated version of the virtual item; and/or writing, via the one or more processors of the backup server, additional data corresponding to the updated virtual item model to the data store associated with the backup server.

In yet another aspect, a computer-implemented method for providing a backup of a virtual item in a virtual environment may be provided. The method may include: (1) receiving, via one or more processors of a backup server, a request to backup the virtual item, the request including: (i) an identifier of the virtual item, and (ii) an identifier of a user that owns the virtual item; (2) sending, via the one or more processors of the backup server, a request for a voucher with the virtual environment server for the virtual item; (3) receiving, via the one or more processors of the backup server and from the virtual environment server, the voucher for the virtual item; (4) receiving, via the one or more processors of the backup server, an indication that the virtual item should be restored to the virtual environment; and/or (5) in response to receiving the indication, redeeming, via the one or more processors of the backup server, the voucher for the virtual item such that a copy of the virtual item is restored to the user. The method may include additional, fewer, or alternate actions, including those discussed elsewhere herein.

In some embodiments, the virtual item is a smaller virtual item included in a larger virtual item larger than the smaller virtual item.

In some embodiments, the larger virtual item includes a virtual house, and the smaller virtual item comprises one of a virtual: electronic device, piece of furniture, or kitchen appliance.

In some embodiments, the redeeming the voucher comprises providing, via the one or more processors, the voucher to the user.

In some embodiments, the redeeming the voucher comprises providing, via the one or more processors, the voucher to the virtual environment server.

In some embodiments, the method further includes: (i) determining, via the one or more processors of the backup server, that the virtual item is no longer available; (ii) identifying, via the one or more processors of the backup server, a replacement virtual item for the virtual item; and/or (iii) requesting, via the one or more processors of the backup server and from the user, approval for the replacement item.

In some embodiments, the method further includes: (i) determining, via the one or more processors of the backup server, that the virtual item is no longer available; (ii) providing, via the one or more processors of the backup server, a set of suggested replacement virtual items for the virtual items to the user; and/or (iii) receiving, via the one or more processors of the backup server, from the user, a selection of a replacement item from the set of replacement items.

Other Matters

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for providing a backup of a virtual item in a virtual environment, comprising:

receiving, via one or more processors of a backup server, a periodic request to backup the virtual item, wherein the periodic request includes a virtual item model associated with the virtual item, and wherein the virtual item model is configured to store data representative of the virtual item such that a virtual environment server is able to import the virtual item into the virtual environment;

identifying, via the one or more processors, a change to the virtual item model;

writing, via the one or more processors of the backup server, the change to the virtual item model to a data store associated with the backup server; and presenting, via the one or more processors of the backup server and to a user associated with the virtual item, a selection between: (i) a copy of the virtual item created from the virtual item model, and (ii) a copy of the virtual item created from an updated virtual item model.

2. The computer-implemented method of claim 1, further comprising:

receiving, via the one or more processors of the backup server, an indication to restore the virtual item to the virtual environment; and restoring, via the one or more processors of the backup server, the virtual item to the virtual environment by:

retrieving the virtual item model from the data store associated with the backup server; and sending the virtual item model to the virtual environment server.

3. The computer-implemented method of claim 1, further including:

periodically receiving, via the one or more processors, an updated virtual item model associated with an updated version of the virtual item; and writing, via the one or more processors of the backup server, additional data corresponding to the updated virtual item model to the data store associated with the backup server.

4. The computer-implemented method of claim 3, further comprising extracting, via the one or more processors, the additional data from the updated virtual item model.

5. The computer-implemented method of claim 4, wherein the writing the additional data comprises writing the updated virtual item model in the data store associated with the backup server.

6. The computer-implemented method of claim 5, further comprising:

receiving, via the one or more processors of the backup server, an indication to restore the virtual item to the virtual environment.

7. The computer-implemented method of claim 1, wherein the virtual item is a virtual house, and wherein the method further comprises:

requesting, via the one or more processors of the backup server, virtual real estate from the virtual environment server; and receiving, via the one or more processors of the backup server, ownership of the virtual real estate from the virtual environment server.

8. The computer-implemented method of claim 7, further comprising:

receiving, via the one or more processors of the backup server, an indication to restore the virtual house to the virtual environment; and sending, via the one or more processors of the backup server and to the virtual environment server, a request to import the virtual item model for the virtual house at the virtual real estate.

9. The computer-implemented method of claim 1, wherein the virtual item is a virtual vehicle, and wherein the method further comprises:

receiving, via the one or more processors, an indication to restore the virtual vehicle to the virtual environment;

obtaining, via the one or more processors, a virtual location associated with a virtual character corresponding to the virtual vehicle; and sending, via the one or more processors, and to the virtual environment server, a request to import the virtual item model for the virtual vehicle at the virtual location associated with the virtual character corresponding to the virtual vehicle.

10. The computer-implemented method of claim 1, wherein the virtual item is a virtual character, and wherein the method further comprises:

receiving, via the one or more processors, an indication to restore the virtual character to the virtual environment;

obtaining, via the one or more processors, an indication of a virtual restore location associated with the virtual character; and sending, via the one or more processors, and to the virtual environment server, a request to import the virtual item model for the virtual character at the virtual restore location.

11. The computer-implemented method of claim 1, wherein the virtual environment is a first virtual environment, the virtual environment server is a first virtual environment server, and the method further comprises:

receiving, via the one or more processors of the backup server, an indication to restore the virtual item to a second virtual environment.

12. The computer-implemented method of claim 11, further comprising:

converting, via the one or more processors of the backup server, the virtual item model to a format operable to import the virtual item into the second virtual environment; and sending, via the one or more processors of the backup server and to the second virtual environment server, a request to import the converted virtual item model into the second virtual environment.

13. The computer-implemented method of claim 11, further comprising sending, via the one or more processors of the backup server and to the second virtual environment server, a request to import the virtual item model into the second virtual environment.

14. A computer device for providing a backup of a virtual item in a virtual environment, the computer device comprising one or more processors of a backup server configured to:

receive a periodic request to backup the virtual item, wherein the periodic request includes a virtual item model associated with the virtual item, and wherein the virtual item model is configured to store data representative of the virtual item such that a virtual environment server is able to import the virtual item into the virtual environment;

identify a change to the virtual item model;

write the change to the virtual item model to a data store associated with the backup server; and present, to a user associated with the virtual item, a selection between: (i) a copy of the virtual item created from the virtual item model, and (ii) a copy of the virtual item created from an updated virtual item model.

15. The computer device of claim 14, wherein the one or more processors of the backup server are further configured to:

receive a selection of the: (i) copy of the virtual item created from the virtual item model, or (ii) copy of the virtual item created from an updated virtual item model; and send, to the virtual environment server, according to the received selection, the (i) copy of the virtual item created from the virtual item model, or (ii) copy of the virtual item created from an updated virtual item model.

* * * * *